(12) United States Patent
Katz et al.

(10) Patent No.: US 11,715,131 B2
(45) Date of Patent: *Aug. 1, 2023

(54) SYSTEMS AND METHODS FOR AD-SUPPORTED MOBILE DATA PLANS OR IN-APP PURCHASES

(71) Applicant: Yahoo Ad Tech LLC, New York, NY (US)

(72) Inventors: Jeffrey B. Katz, Brookeville, MD (US); Chad Gallagher, Baltimore, MD (US); Lucas J. Matyja, Baltimore, MD (US)

(73) Assignee: Yahoo Ad Tech LLC, New York, NY (US)

( * ) Notice: Subject to any disclaimer, the term of this patent is extended or adjusted under 35 U.S.C. 154(b) by 121 days.

This patent is subject to a terminal disclaimer.

(21) Appl. No.: 17/445,011

(22) Filed: Aug. 13, 2021

(65) Prior Publication Data
US 2021/0374807 A1    Dec. 2, 2021

Related U.S. Application Data

(63) Continuation of application No. 16/735,991, filed on Jan. 7, 2020, now Pat. No. 11,120,475, which is a continuation of application No. 14/554,642, filed on Nov. 26, 2014, now Pat. No. 10,565,623.

(60) Provisional application No. 62/046,007, filed on Sep. 4, 2014, provisional application No. 61/955,038, filed on Mar. 18, 2014, provisional application No. 61/932,296, filed on Jan. 28, 2014.

(51) Int. Cl.
G06Q 30/02       (2023.01)
G06Q 30/0251     (2023.01)
G06Q 30/0272     (2023.01)

(52) U.S. Cl.
CPC ..... *G06Q 30/0267* (2013.01); *G06Q 30/0272* (2013.01)

(58) Field of Classification Search
CPC ....... G06Q 30/0207–30/0277; G06Q 30/0267; G06Q 30/0272
USPC ....................................................... 705/14.1
See application file for complete search history.

(56) References Cited

U.S. PATENT DOCUMENTS 6,185,625 B1 *   2/2001   Tso ...................... G06F 16/9577
                                                            709/217
7,734,474 B2 *   6/2010   Ranganathan ......... G06Q 10/02
                                                            345/207
8,671,423 B1 *   3/2014   Chang ................ H04N 21/4755
                                                            725/32

(Continued)

OTHER PUBLICATIONS

International Search Report and Written Opinion issued in corresponding Application No. PCT/US2015/012905, dated May 7, 2015 (8 pages).

(Continued)

*Primary Examiner* — Thuy N Nguyen
(74) *Attorney, Agent, or Firm* — Bookoff McAndrews, PLLC

(57) ABSTRACT

Methods are disclosed for providing an ad-supported mobile data plan, where ad display may be tied to data usage levels and user input. A method includes receiving, using at least one processor, user interaction with advertisement content displayed on a device; retrieving, using the at least one processor, a data usage limit associated with the device; and causing a change in the data usage limit based on the user interaction with the advertisement content displayed on the device.

20 Claims, 24 Drawing Sheets

(56) References Cited

U.S. PATENT DOCUMENTS

| | | | |
|---|---|---|---|
| 9,049,589 B2* | 6/2015 | Zalmanovitch | H04M 15/86 |
| 9,137,238 B1* | 9/2015 | Jakobsson | G06F 21/46 |
| 9,398,142 B2* | 7/2016 | Lee | G06Q 30/0241 |
| 10,165,108 B1* | 12/2018 | Douglas | G06Q 30/0262 |
| 2002/0026349 A1* | 2/2002 | Reilly | H04N 21/812 |
| | | | 705/26.1 |
| 2007/0088801 A1* | 4/2007 | Levkovitz | H04L 67/20 |
| | | | 709/217 |
| 2010/0188975 A1* | 7/2010 | Raleigh | G06Q 20/20 |
| | | | 370/230.1 |
| 2010/0211431 A1* | 8/2010 | Lutnick | G06Q 30/0212 |
| | | | 705/14.12 |
| 2011/0106622 A1 | 5/2011 | Kuhlman et al. | |
| 2012/0101952 A1* | 4/2012 | Raleigh | H04L 12/1417 |
| | | | 709/223 |
| 2012/0155380 A1 | 6/2012 | Hodges | |
| 2012/0163232 A1 | 6/2012 | Yoo | |
| 2013/0256403 A1 | 10/2013 | Keith | |
| 2014/0019253 A1* | 1/2014 | Ricasata | G06Q 30/0241 |
| | | | 705/14.66 |
| 2014/0220927 A1* | 8/2014 | Girard | H04M 15/09 |
| | | | 455/405 |
| 2015/0039440 A1 | 2/2015 | Doumet | |
| 2017/0034328 A1* | 2/2017 | Lee | G06Q 30/0241 |

OTHER PUBLICATIONS

Takahashi, Dean "Adenda lets games and apps display animations on your Android phone's lock screen" http://venturebeat.com/2014/04/22/adenda-lets-games-and-apps-display-animations-on-your-android-phones-lock-screen/. Apr. 22, 2014, (4 pages).

* cited by examiner

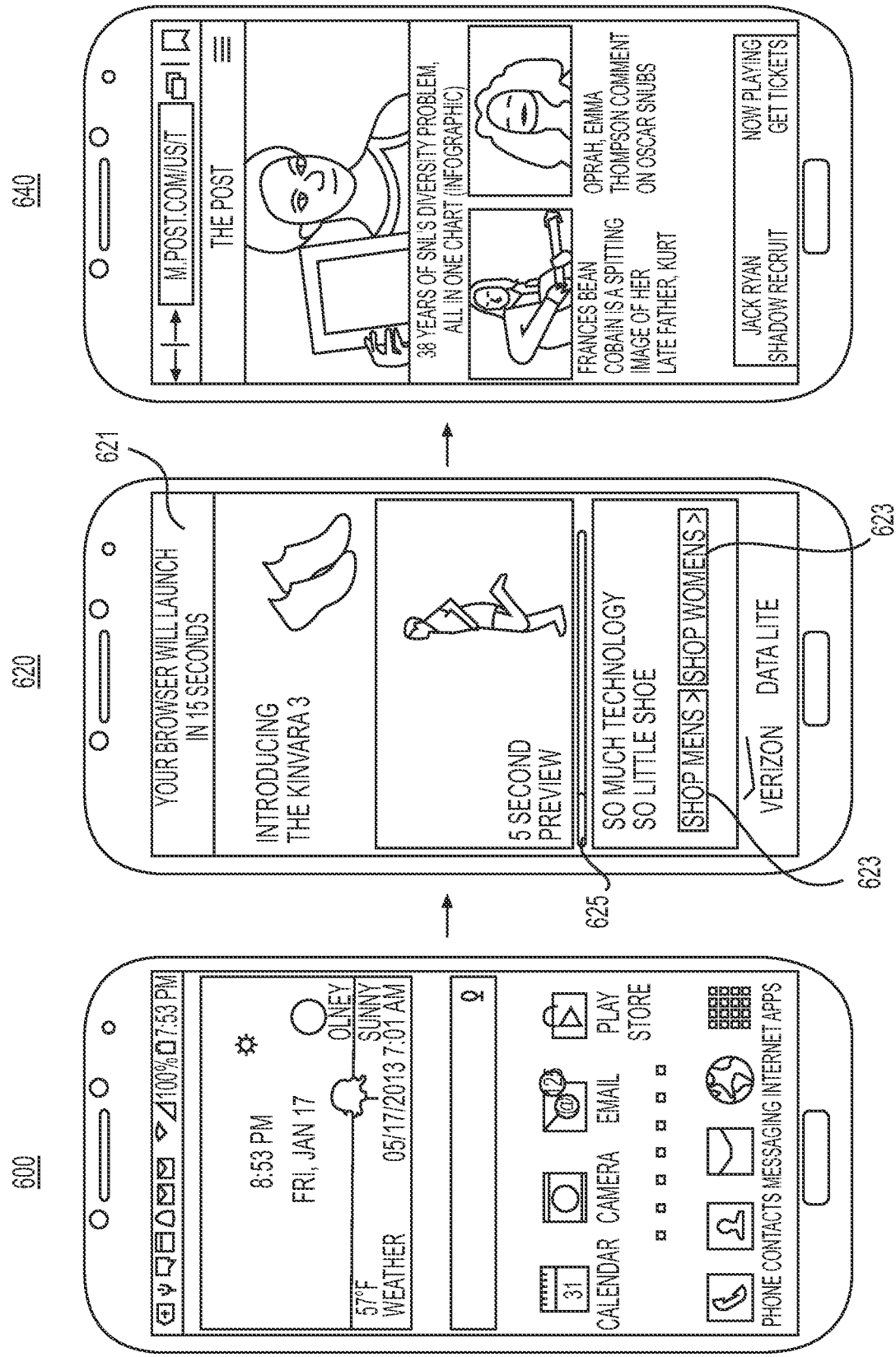

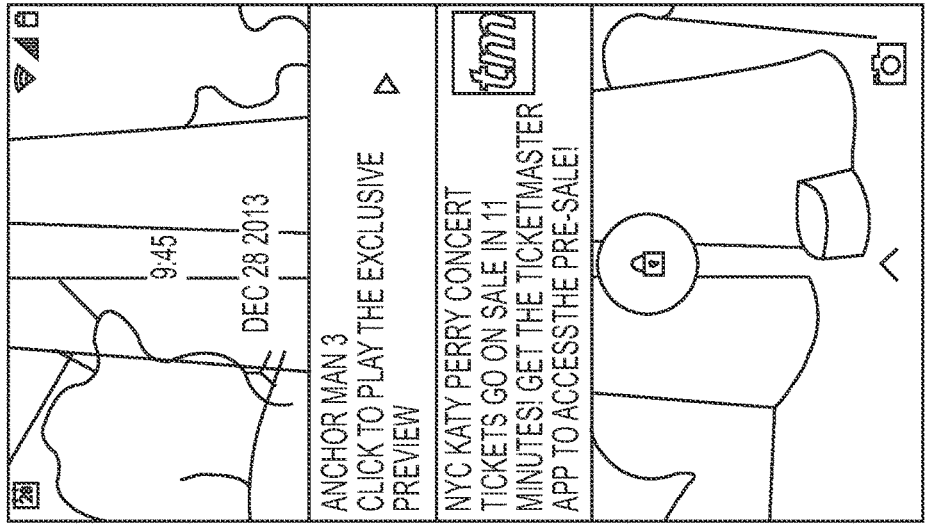
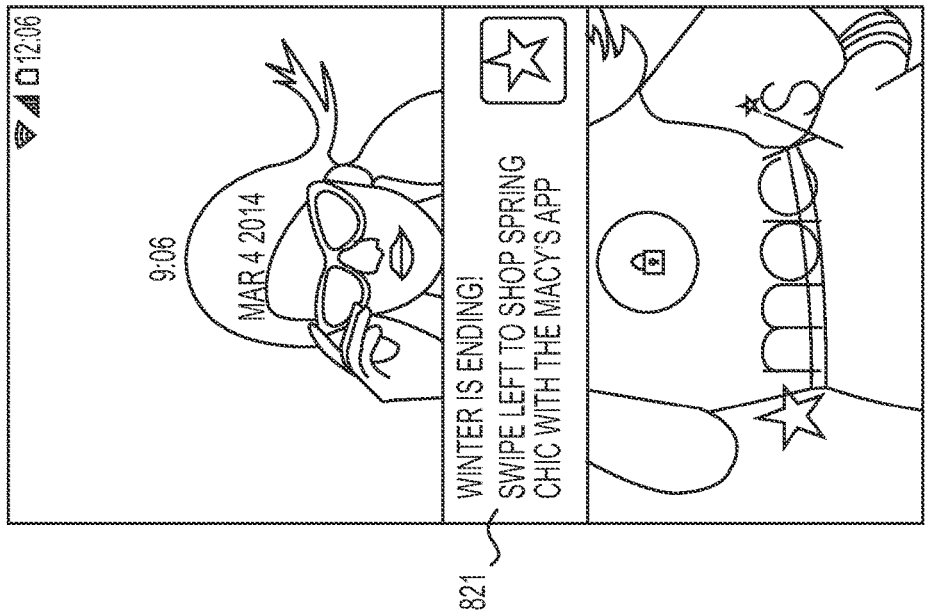
FIG. 8B

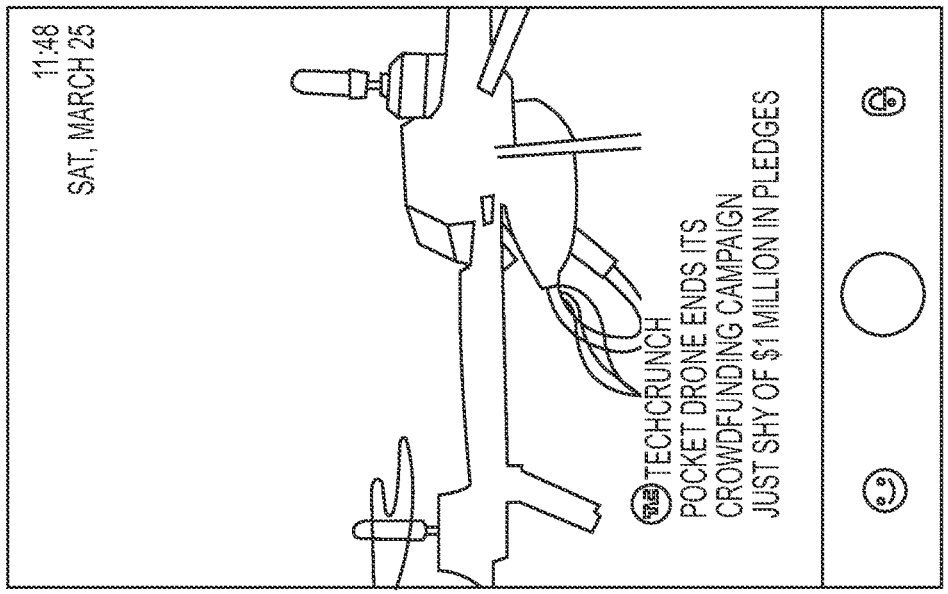
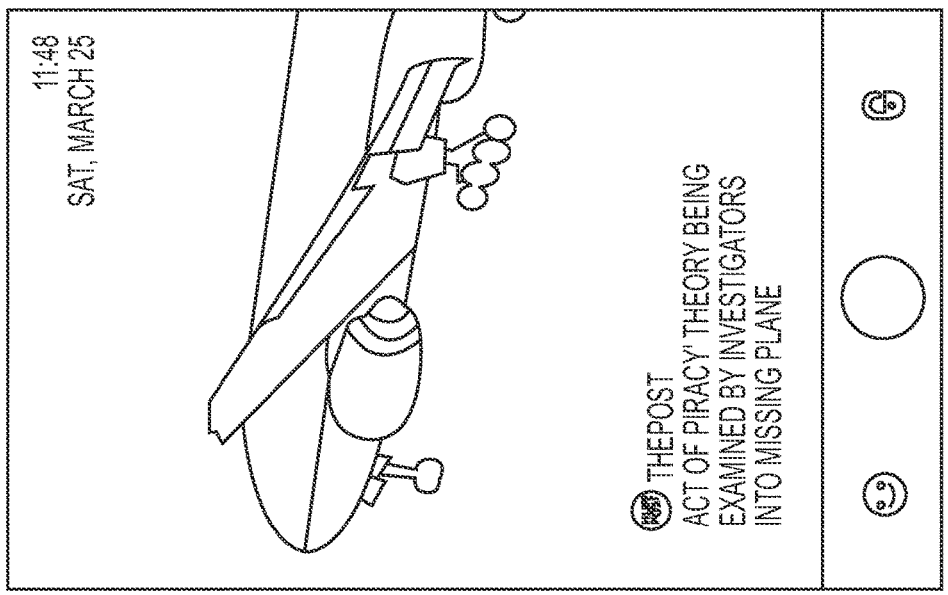
FIG. 8C

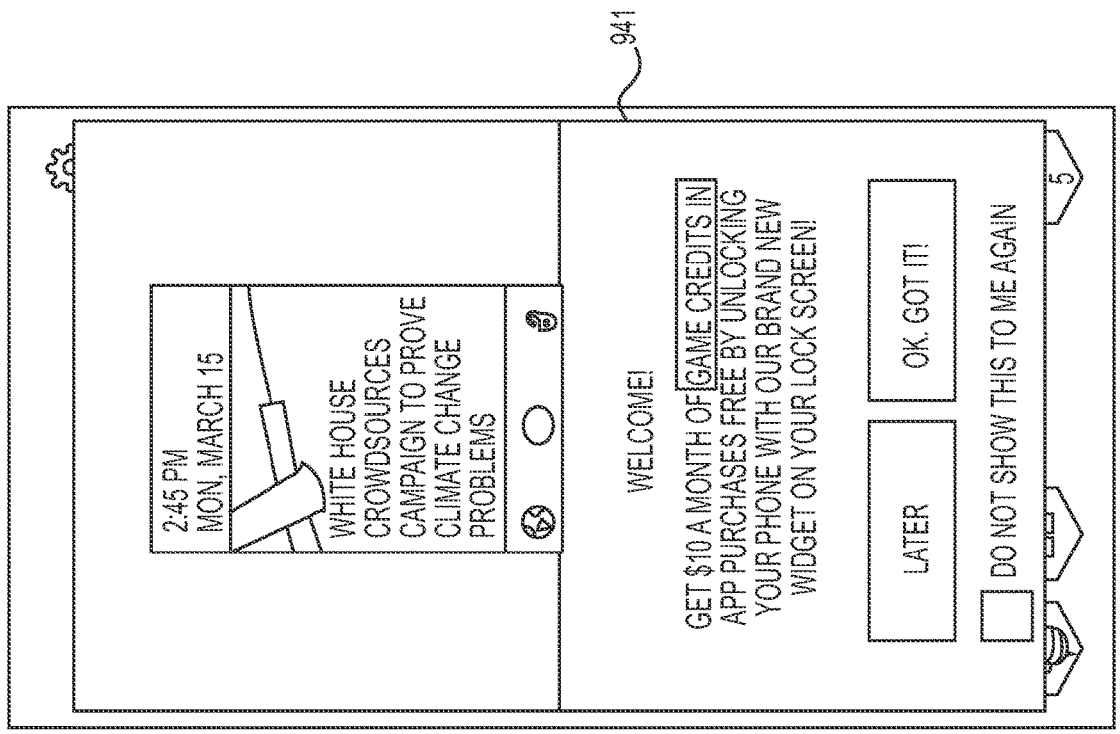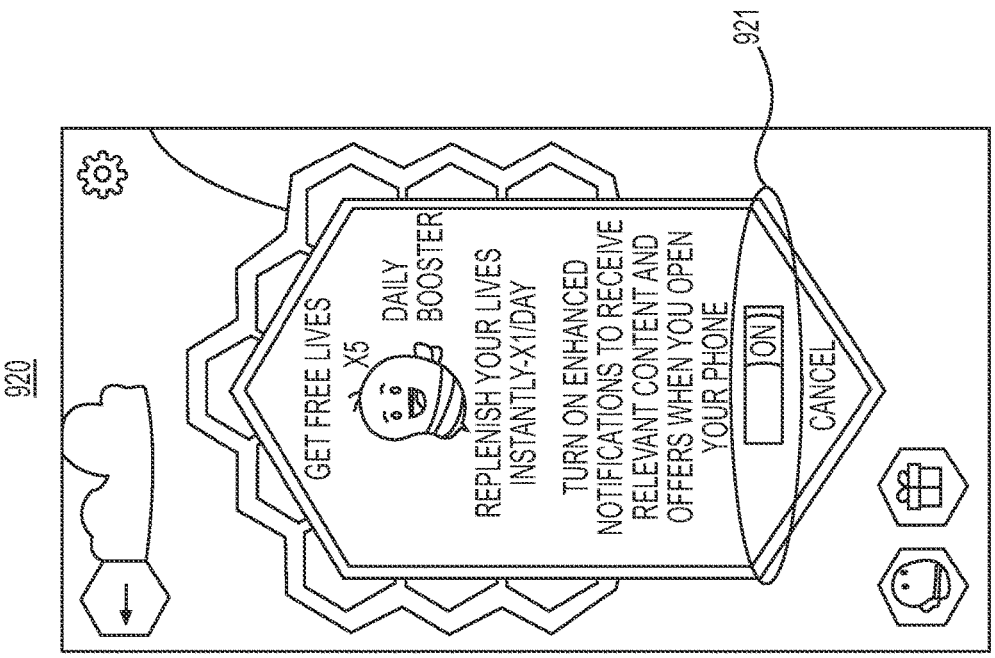
FIG. 9B

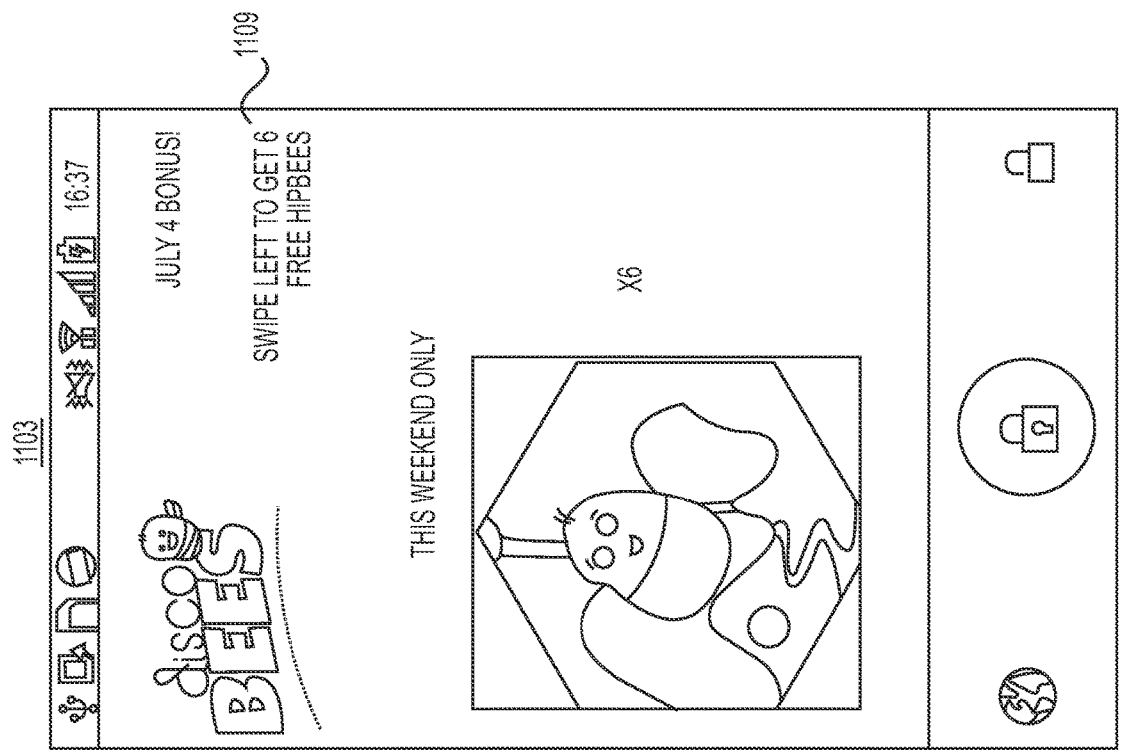
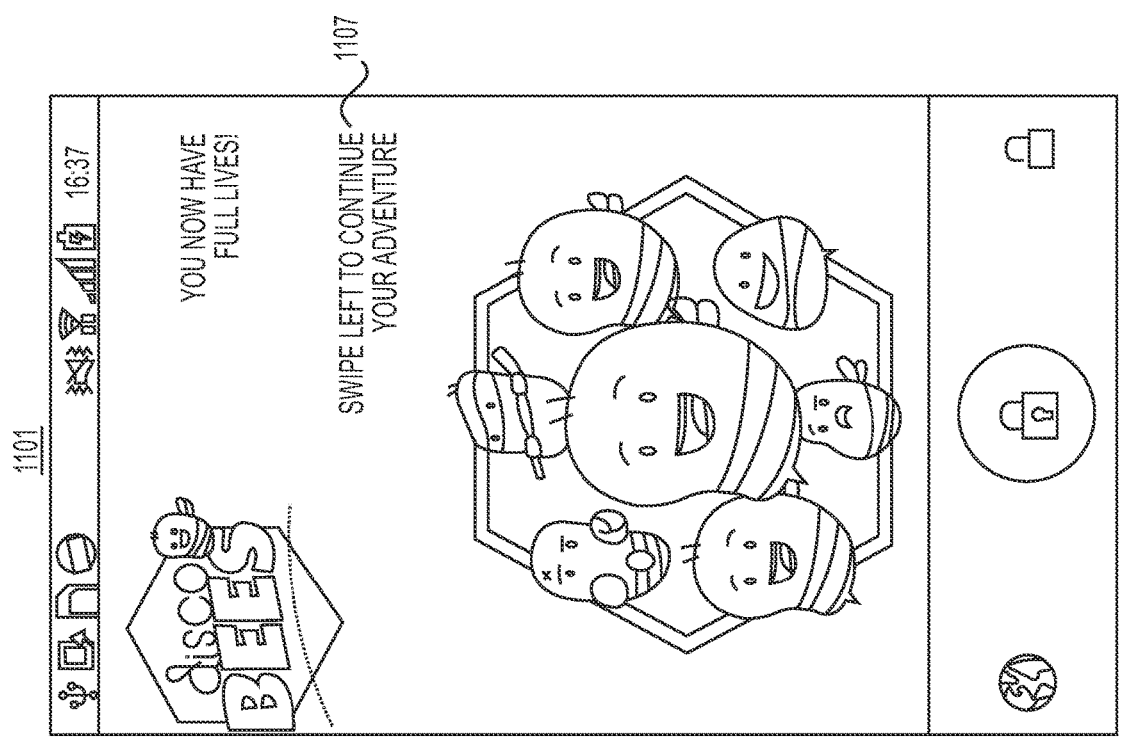
FIG. 11A

FIG. 12A

SYSTEMS AND METHODS FOR AD-SUPPORTED MOBILE DATA PLANS OR IN-APP PURCHASES

PRIORITY

This patent application is a continuation of and claims the benefit of priority to U.S. application Ser. No. 16/735,991, filed Jan. 7, 2020, which is a continuation of and claims the benefit of priority to U.S. application Ser. No. 14/554,642, filed Nov. 26, 2014, which claims the benefit of priority from U.S. Provisional Application Nos. 61/932,296 filed Jan. 28, 2014, No. 61/955,038 filed Mar. 18, 2014, and No. 62/046,007 filed Sep. 4, 2014, the entireties of which are incorporated herein by reference.

TECHNICAL FIELD

Various embodiments of the present disclosure relate generally to mobile advertising, mobile data usage, and electronic transactions and messaging. More specifically, particular embodiments of the present disclosure relate to systems and methods for managing mobile advertising and electronic transactions and messaging based on consumer characteristics, consumer data usage, and consumer interactions.

BACKGROUND

Consumers are increasingly using their mobile devices to access online content, such as websites, videos, and photos, as well as mobile and online services, such as electronic messaging, social networking, and the like. With the increasing availability of such mobile content and services, the use of mobile devices in this manner often involves significant amounts of data usage. Data usage is expensive from the perspective of mobile services networks or carriers. As a result, mobile networks and carriers typically pass along the significant costs of regular and heavy data usage to their customers in the form of monthly subscription contracts or pay-as-you-go subscriptions that are often perceived as being expensive for average consumers. Meanwhile, users are often unwilling or unable to pay for an amount of data that they use and/or desire to use. Some users opt out of data plans altogether.

At the same time, mobile devices present prime opportunities for displaying advertisements of different types. Users spend expansive amounts of time looking at and interacting with their mobile device screens. Companies (i.e., advertisers of goods and services) and any other editorial- or sponsored-content providers would therefore benefit from the ability to capitalize on the screen time and engage in more opportunities to advertise. Specially, an average user checks their phone more than ninety times in a day, with a lock screen having significantly higher engagement than any other mobile real estate.

Accordingly, a need exists for systems and methods for enabling various advertising and content displays in exchange for permitting certain levels of mobile data consumption. More generally, a need exists for systems and methods for managing ad-supported mobile data plans.

SUMMARY

According to an exemplary embodiment, a method is disclosed for providing an ad-supported mobile data plan, where the display of ad content may be associated with data usage levels and user input (e.g., interaction with the ad content or opting to provide information useful to content providers). For example, displayed ads and ad content may be characterized by different attributes. One attribute may include the format of the displayed ad (e.g., whether the displayed ad is large or small relative to a user interface, how long the display lasts, and a static versus dynamic display). One exemplary method includes receiving, using at least one processor, user interaction with advertisement content displayed on a device; retrieving, using the at least one processor, a data usage limit associated with the device; and causing a change in the data usage limit based on the user interaction with the advertisement content displayed on the device. Determining the attributes for ad display may further take into account whether a user has interacted with previously displayed ad content and/or whether the user volunteered information that content providers may use to target their content.

Another embodiment may include a system for processing electronic transactions between a between a device and content provider, the system comprising: a data storage device storing instructions for processing electronic transactions; and a processor configured to execute the instructions to perform a method comprising: receiving, using at least one processor, user interaction with advertisement content displayed on a device; retrieving, using the at least one processor, a data usage limit associated with the device; and causing a change in the data usage limit based on the user interaction with the advertisement content displayed on the device.

Additional embodiments and advantages will be set forth in part in the description which follows, and in part will be obvious from the description, or may be learned by practice of the disclosure. The embodiments and advantages will be realized and attained by means of the elements and combinations particularly pointed out below.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

FIG. 6 includes diagrams of user interfaces showing static or dynamic content display, according to an exemplary embodiment of the present disclosure.

FIGS. 8A-8D include diagrams of user interfaces relating to a locked screen, according to an exemplary embodiment of the present disclosure.

FIGS. 9A-9D are diagrams of exemplary user interfaces indicating offers in exchange for a user using a service or app-related lock screen, according to an exemplary embodiment of the present disclosure.

FIGS. 12A and 12B include diagrams of user interfaces showing data usage, according to an exemplary embodiment of the present disclosure.

DESCRIPTION OF THE EMBODIMENTS

Figure 1:
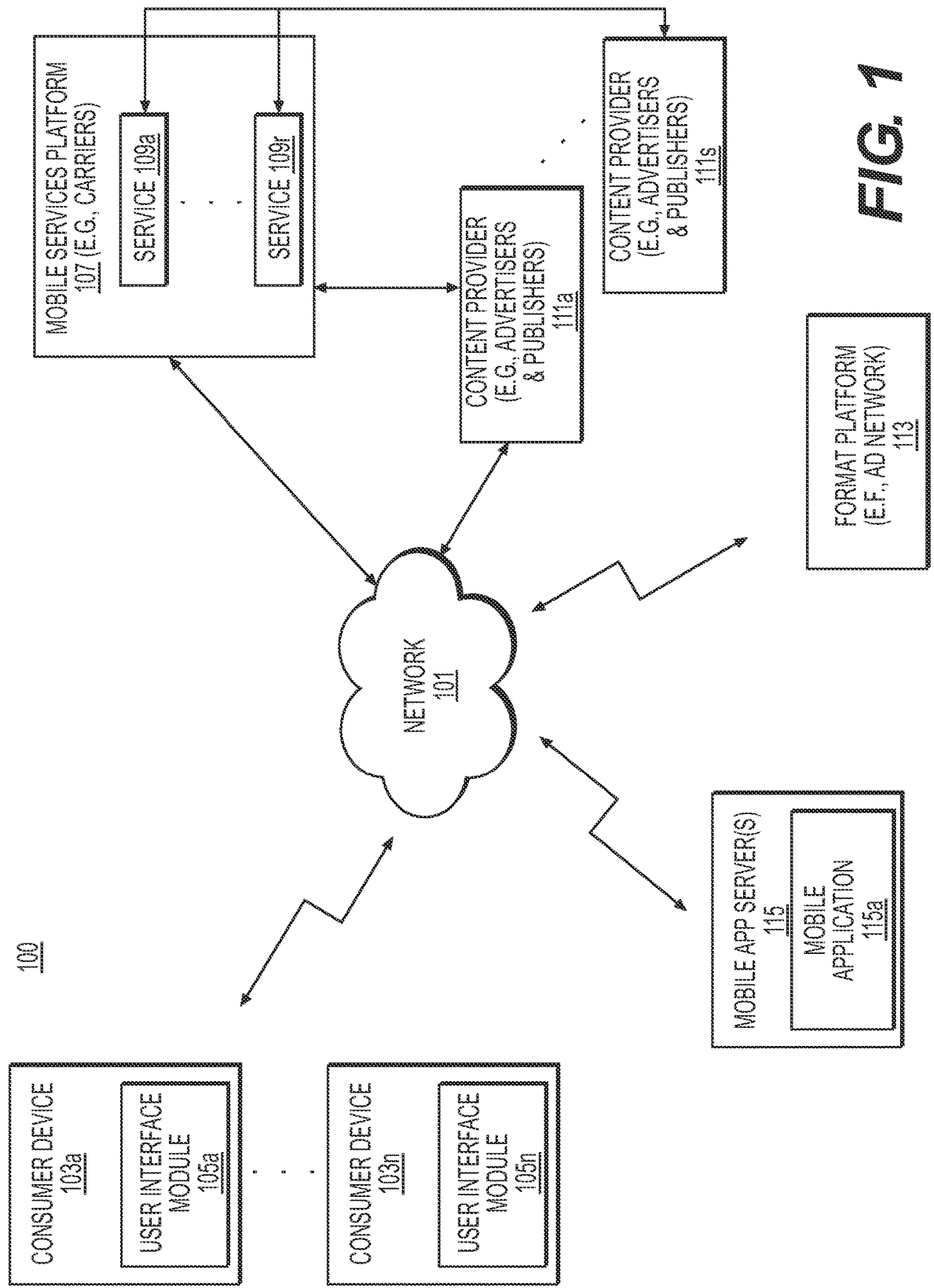
FIG. 1 is a block diagram of an exemplary environment 100 and network 101 for selecting ad displays according to data usage, according to an exemplary embodiment of the present disclosure.

Reference will now be made in detail to the exemplary embodiments of the disclosure, examples of which are illustrated in the accompanying drawings. Wherever possible, the same reference numbers will be used throughout the drawings to refer to the same or like parts.

In view of the challenges outlined above, systems and methods are disclosed for enabling carriers to offset users' unpaid data usage, for example, by displaying content. Specifically, the content displayed may refer to advertisements. For example, systems and methods are disclosed for enabling carriers to dictate content attributes for displays relative to users' data consumption. As described above, other known characteristics may also be used in conjunction with or in the alternative to the principles of the present disclosure.

One embodiment may involve displaying advertisements in formats dictated by a user's data consumption relative to the user's data plan. For example, advertisements on a user's device may be displayed more prominently (e.g., lock screen displays, displays that take up a large portion of a screen, displays that request user interaction before a user may resume usage of his device, etc.) if a user is nearing the limit of data consumption on a respective data plan. In contrast, a user well within the data consumption quotas of his data plan may experience few advertisements or inconspicuous displays (e.g. advertisement displays that take up a smaller portion of a screen, static displays, displays that do not interrupt a user's activity to request a user interaction, etc.).

The ad display (or ad-supported data plan) may offset express user payment of a higher data plan, while still permitting a user to experience the benefits of a higher data plan. For example, a user experiencing many ads being displayed on her device (since her data consumption exceeds her current data plan) may realize that a higher data plan may be more appropriate for her desired data consumption, and thus purchase a higher data plan. Since her data consumption may then be well within the usage limits of her new data plan, ad displays may be less prominent than the displays when the data usage exceeded the limits permitted by the user's data plan. In another use case, a user may exceed his data plan only on rare occasions. The ad-supported data plan may allow the user to surpass the data plan allotment in exchange for displaying ads at the user's interface for a set period of time, and the user may conclude that his usage does not warrant a data plan upgrade. In yet another scenario, a user may find that his user experience is virtually free of ads, in which case, his data plan may far exceed his actual, regular data consumption. This user may then decide to switch to a lower data plan. In other words, the ad-supported data plan may permit users to seamlessly experiment with data plans and find data plans that suit their data consumption.

Alternately or in addition, one embodiment may include displaying a prompt to a user regarding selections of alternate data plans. For example, a prompt may indicate a user's data consumption relative to consumption limits of his data plan. The prompt may suggest alternate data plan(s), including data plans of higher data usage allocations, data plans with lower data usage allocations, data plans incorporating ads (e.g., where various data allocations may be subsidized by various forms of ad display on the user's device), etc. In one embodiment, such prompts may be displayed when a user is observed to be regularly consuming data at levels better corresponding to data plans other than the user's data plan.

In one embodiment, displays may include rendering advertisements on a default device interface, e.g., a lock screen. For example, a lock screen may include a screen that a device displays when a user interacts with a device after a period of being idle. In some cases, a lock screen requests an interaction from a user in order for a user to proceed with using the device. For instance, a lock screen may prompt a user to enter a code, perform a movement or gesture, enter a form of identification (e.g., biometric identification), select an option out of a multiple options, etc. The present disclosure further describes displaying sponsored content in a default device interface. In some interfaces, a default device interface may present sponsored content and allow a user to access (e.g., download) content related to the sponsored content (e.g., promotions, virtual currency, more sponsored content, a widget or app representing the sponsor, etc.). In some cases, the sponsored content may be associated with a specific goods or services provider, e.g., a sponsored content lock screen. In other cases, the sponsored content may present content from a decentralized assortment of goods and/or services. The embodiments described may be applied to various displays, including heads up displays or wearable devices (e.g., smart watches and glasses), mobile phones, tablets, etc.

FIG. 1 is a block diagram of an exemplary environment 100 and network 101 for selecting content and/or ad attributes according to data usage, according to an exemplary embodiment of the present disclosure. As shown in FIG. 1, environment 100 may include a plurality of consumer devices 103a-103n. In one embodiment, the consumer devices 103a-103n may be operated by consumers 103 (not shown). Consumer devices 103a-103n may be disposed in communication with mobile services platform 107 with services 109a-109r or content providers 111a-111s. Services 109 may include carriers and/or service providers, including data plan providers as well as providers of user preferences, profiles, or demographics information. Content providers 111 may include publishers or advertisers of any variety. For instance, content providers 111 may serve as a source for advertisements or any sponsored content.

Consumers 103 may communicate or provide input to the services 109 or content providers 111 via user interface modules 105a-105n. For example, user interface modules 105 may create renderings on consumer devices 103a-103n where associated users may interact with the rendering. Users may act on renderings in order to follow links, find more information, share information, input preferences, etc.

The consumers 103, services 109, and content providers 111 may communicate over the network 101, such as over the Internet or a mobile network.

Services 109 and content (or ad) providers 111 may be in communication through network 101, which may include the Internet, a content distribution network, or any other wired, wireless, and/or telephonic network. Thus, services 109 may be configured to transmit data received from consumers 103 to content providers 111 and vice versa. For example, consumers 103 may provide information to content providers 111 regarding their preferences and content providers 111 may transmit to consumers 103 content that fits the preferences.

Next, the format platform 113 may include a content and/or advertising network. For instance, the format platform 113 may be an advertisement network that houses and curates a collection of sponsored content from content providers 111. Format platform 113 may create, profile, and track connections between content attributes, data usage, and/or user input. For example, the format platform 113 may determine to render on a consumer device 103a, a static advertisement banner for one data plan, whereas another data plan may cause the format platform 113 to initiate a video advertisement. The format platform 113 may further take into account user history, profile information, preferences, and/or content information in selecting content to display. In one embodiment, engagement or interaction between format platform 113 and consumer device 103a-103n may be initiated by a user. For example, a user may enable an ad-supported mobile data plan using one click (e.g., by clicking a settings option, advertisement, data selection option, content start screen, notification, etc.).

In one embodiment, mobile application server(s) 115 may include or host mobile application 115a, which may function as an interface or intermediary between consumers 103, services 109, content providers 111, and the format platform 113. For example, the mobile application 115a may initiate when consumers 103 are actively consuming data and prompt services 109 to monitor the data use. Then, when data use crosses certain use parameters or thresholds, the mobile application 115a may cause format platform 113 to determine what type of content to request from the content providers 111. Consumers 103, services 109, content providers 111, format platform 113, and mobile application 115a may all communicate over network 101, which, again, may include the Internet or any other wired, wireless, and/or telephonic network. In a further embodiment, mobile application 115a may collect data points from the interaction between services 109 and content providers 111. Such data may include device identifiers, awareness of single user's usage across multiple devices, connecting users between apps and the web, determining email exchange information, transactional data (both online and offline), geolocation data (e.g., for geo-fencing), mobile app usage (e.g., what apps a user has, how often they the apps are used or accessed, how long a user may engage with each app, how deeply a user navigates within the app, etc.), click stream data, demographic information, and psychographic information. This data may drive better targeting for content distribution from content providers 111 and awareness to anticipate user needs.

As previously discussed, the format of an ad display may be dependent on a user's data usage. For example, ad displays may involve more prominent display formats when a user is nearing a limit on a data plan allocation and more inconspicuous formats may be used when a user is well within the data limits of his respective data plan. In one embodiment, FIG. 2A includes a network component that may detect a user's data usage with respect to data limits of the user's data plan. Then, display formats may be selected to correspond to a user's data usage. Alternately or in addition, a user may be actively prompted to select a new data plan and/or prompted to select a preferred display format when the user's data consumption exceeds data plan limits or falls into a lower data plan. FIG. 2B provides more detail on this selection process by describing a module that may assign attributes to each ad display, for example, by ranking the display format in terms of varying levels of prominence on a display screen. Then, the attributes may be used to select display formats in response to data usage.

Figure 2A:
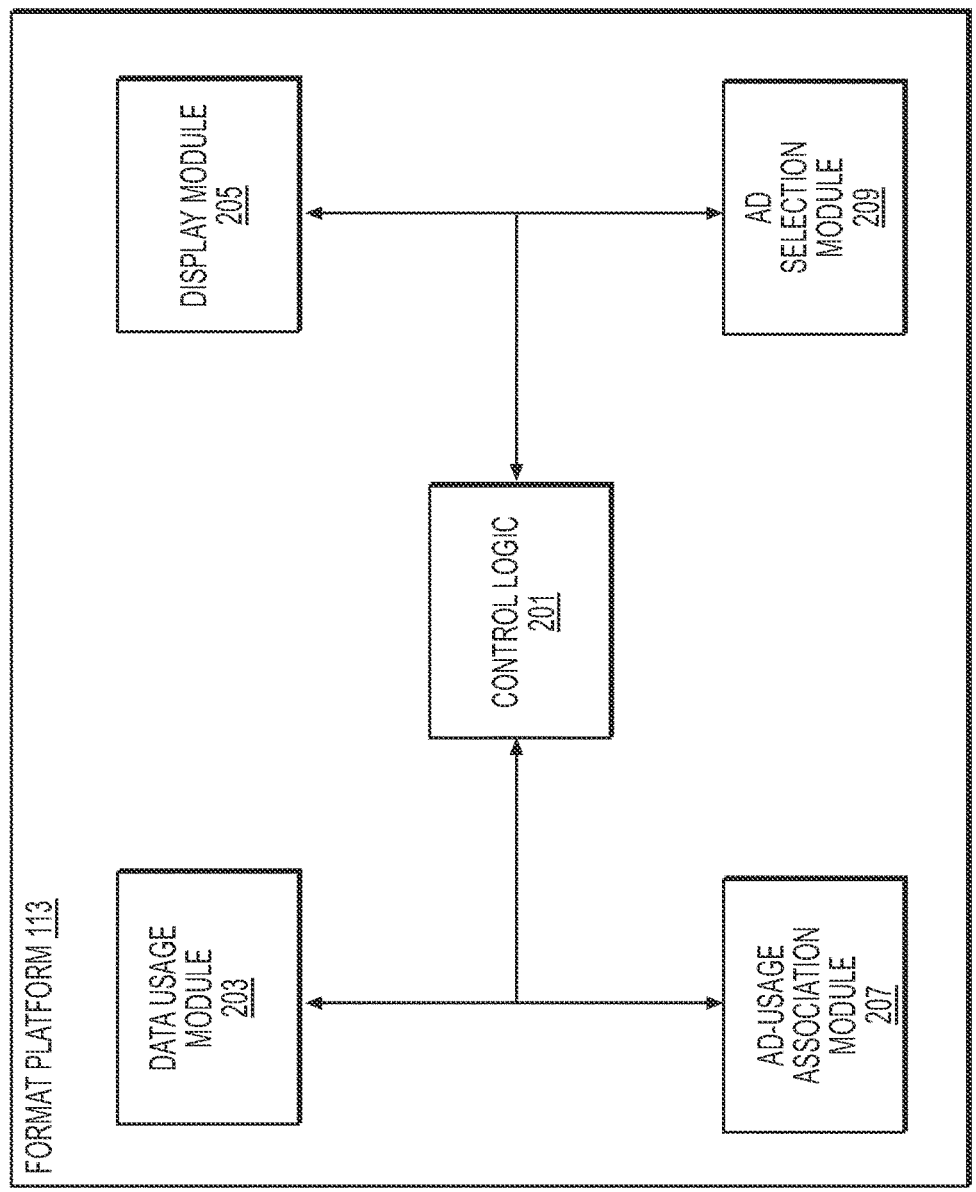
FIG. 2A is a block diagram 200 of format platform 113 for selecting content attributes for display according to data usage, according to an exemplary embodiment of the present disclosure.
Figure 2B:
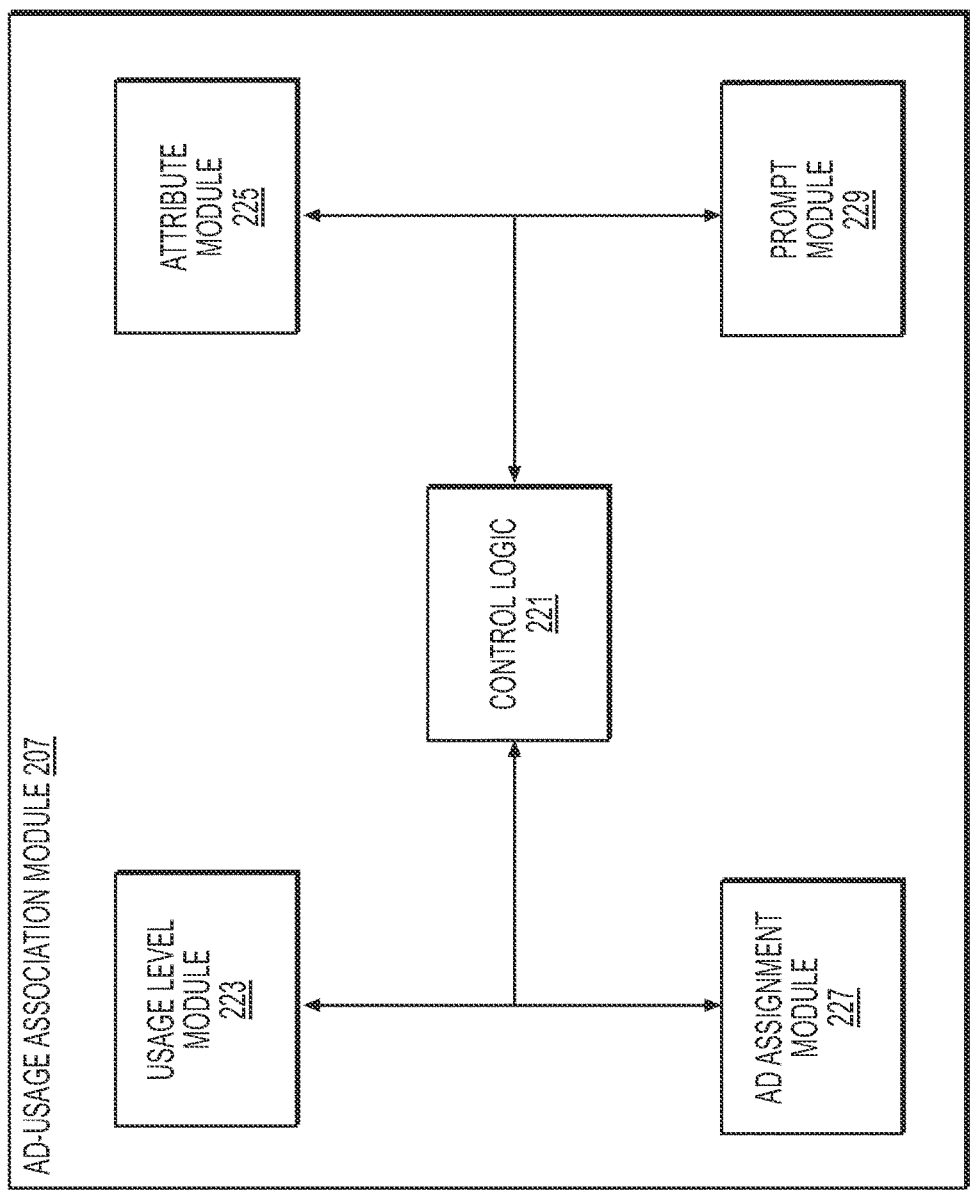
FIG. 2B is a block diagram 220 of ad-usage association module 207 for determining associations between data usage and content to display, according to an exemplary embodiment of the present disclosure.

FIG. 2A is a block diagram of an exemplary model 200 of format platform 113 for selecting ad attributes for display according to data usage, according to an exemplary embodiment of the present disclosure. Model 200 reflects a system that may be implemented by either or both of the services 109 or content providers 111, for communicating with each other over network 101 (e.g., using any suitable modem, wireless adapter, etc.).

As shown in FIG. 2A, format platform 113 may include a control logic 201, a data usage module 203, a display module 205, an ad-usage association module 207, and an ad selection module 209, in one embodiment. Control logic 201 may direct the functions and interactions among the various modules. In one embodiment, the data usage module 203 may determine data usage. The data usage module 203 and control logic 201 may communicate with consumers 103 to determine an amount of data a user is consuming, is on track to consume, and/or is requesting permission to consume (e.g., in a given time period). For example, if a user selects an option to stream a movie via a consumer device 103a, the data usage module 203 and control logic 201 may determine a data plan required to support the streaming.

The display module 205 may determine or create ways that content may be displayed on consumer devices 103a-103n. For example, ad display may include possible presentations, sizes, or layouts, etc. for content. For instance, display module 205 may determine, for a particular content item, browser, application, or type of consumer 103, possible forms of presentation. One format for content display may be a sidebar for advertisements, while another format may include a banner across the top of a screen. The displays may also be of different shapes or sizes. For instance, one display could occupy an entire screen, while another display may take up portions of a screen in varying degrees. Yet another display option may include showing more than one content item simultaneously. For example, the display module 205 may determine that some consumer devices 103a-103n may permit content to be shown concurrently.

The ad-usage association module 207 may determine associations between data usage and content to display. For example, the ad-usage association module 207 may determine that high data usage is associated with more obtrusive content, including video advertisements of increasing length or larger static advertisement banners. The ad-usage association module 207 may determine various levels of data usage and tie certain content or content types to each of the levels. In one exemplary case, the ad-usage association module 207 may determine a hierarchy of content types from least to most visible and align the hierarchy with a continuum of data usage, from low data consumption to high data consumption. Further detail is included, for example, at FIG. 2B.

The ad selection module 209 may select ad content for display. The selection may be contingent on associations from the ad-usage association module 207. In one embodiment, the ad selection module 209 may further incorporate selection based on user input. One type of user input may include user interaction with selected content. In an example where selected content is an advertisement, ad selection module 209 may prompt increasing a user's data plan when a user clicks on the advertisement. Ad selection module 209 may further elect minimally obtrusive content or no content displays for a period of time if a user often interacts thoroughly with the advertisement or perhaps "converts" (e.g., "clicks through") the advertisement, or makes a purchase through the advertisement.

FIG. 2B is a block diagram of an exemplary model 220 of ad-usage association module 207 for determining associations between data usage and content to display, according to an exemplary embodiment of the present disclosure. In other words, FIG. 2B includes further detail on the ad-usage association model 207 described in FIG. 2A. Model 220 reflects a system that may be implemented by either or both of the services 109 and content providers 111, for communicating with each other over network 101 (e.g., using any suitable modem, wireless adapter, etc.).

As shown in FIG. 2B, in one embodiment, ad-usage association module 207 may include a control logic 221, a usage level module 223, an attribute module 225, an ad assignment module 227, and a prompt module 229, in one embodiment. Control logic 221 may direct the functions and interactions among the various modules. In one embodiment, usage level module 223 may identify various possible data plans or packages. The usage level module 223 may further determine threshold data consumption amounts that may characterize a transition between various data plans. In other words, usage level module 223 may sort data plans into data consumption levels, for example, distinguished by threshold data limits.

Attribute module 225 may determine attributes associated with content from content providers 111. Content providers 111 may provide ads in different forms, where attribute module 225 may identify attributes to distinguish the forms of ad content from one other. Content attributes may include formats, type, size, shape, static or dynamic, frequency, and duration. Formats, type, size, and shape may refer to how content appears as it is displayed. For instance, content providers 111 may provide a single frame as an advertisement, where the frame can appear in different sizes on a display of a consumer device 103*a*. The frame may further be adjusted, where smaller display sizes are subsets of content over larger display sizes so that content may maintain clarity. Attributes of "static" or "dynamic" may refer to whether ad content contains multiple frames. For example, a single display or photographic or graphic advertisement would comprise static content, whereas a video or animation advertisement may qualify as dynamic content. Frequency may dictate how often content may be displayed, and duration may be the length of the display or content itself. For example, duration for a static display may refer to how long a single frame advertisement remains on a consumer 103 display. Duration for a video or audio content item may be the total playing time of the content item.

In a further embodiment, attribute module 225 may group content based on attributes or determine sets of attributes as equivalents. For instance, attribute module 225 may determine all dynamic content as one grouping or further categorize dynamic content based on length or duration of the content. Equivalents may include, for example, determining that five static ads displayed for 20 seconds each, is equivalent to dynamic advertisements that are less than two minutes long. This may translate into displaying either the five static ads for 20 seconds each or the two-minute dynamic advertisement interchangeably.

Ad assignment module 227 may determine associations between the usage levels (from the usage level module 223) and content for display. In one embodiment, the content for display is selected based on attributes associated with the content, as given by attribute module 225. Ad assignment module 227 may further take into account user preferences, context information, and/or user interaction information. User preferences may include preferences either actively entered or volunteered by a user or preferences determined based on past user history and/or behavior. User information may include user location information or temporal parameters. User interaction information may include, for instance, whether a user has interacted with content, affiliates associated with content services 109 and/or content providers 111, whether a user has volunteered information to content providers 111 (e.g., to improve advertisement targeting), and/or whether a user has shared content or directed other users to displayed content selected by the format platform 113.

For example, ad assignment module 227 may dictate that a user may receive a higher data plan with less obtrusive or fewer ad displays based on the number of friends a user invites to join services rendered either by format platform 113 and/or affiliates of the services 109, content providers 111, and/or service platform. In a further instance, the data plan and ad display may further be contingent on how many of those invited friends actually sign up for format platform 113's ad-supported plan or promotions and offers from the affiliates. The ad assignment module 227 may employ cookies and/or user or device opt-in or permission models to gather the interaction information. For example, the ad assignment module 227 may observe a user's click stream or determine that a user has committed to receiving a certain quantity of content via selection by the format platform 113. Given this information, the ad assignment module 227 may determine content to display relative to a data usage level.

The prompt module 229 may determine triggers for changes in attributes relating to content display, for example, as caused by changes in data usage or user actions with content. Exemplary prompts may include determining intermediary thresholds relative to the thresholds that differentiate between various data usage levels. Then, control logic 221 or control logic 201 may initiate a change in content for display before or as a user nears the upper limit of their current data plan. The prompt module 229 may mean that the system does not wait for a data usage level to be upgraded before changing how or what content is displayed. Alternatively, the prompt module 229 may also dictate when content display attributes may be changed since a user has been consuming less data for a given period of time. In other words, the prompt module 229 may determine triggers for changing the ad display experience due to a data usage level drop.

Prompt module 229 may further include generating and presenting options for a user, as a user is changing data usage levels. For instance, if a user commits an action that will require that the upgrade his data plan, prompt module 229 may interact with a relevant user interface module 105 to create a notification, asking the user to select options out of various advertisement experiences or to interact with advertisements and/or affiliates of services 109. The user may be prompted to abide by the options given by the prompt module 229 in order to upgrade the data plan.

Figure 3:
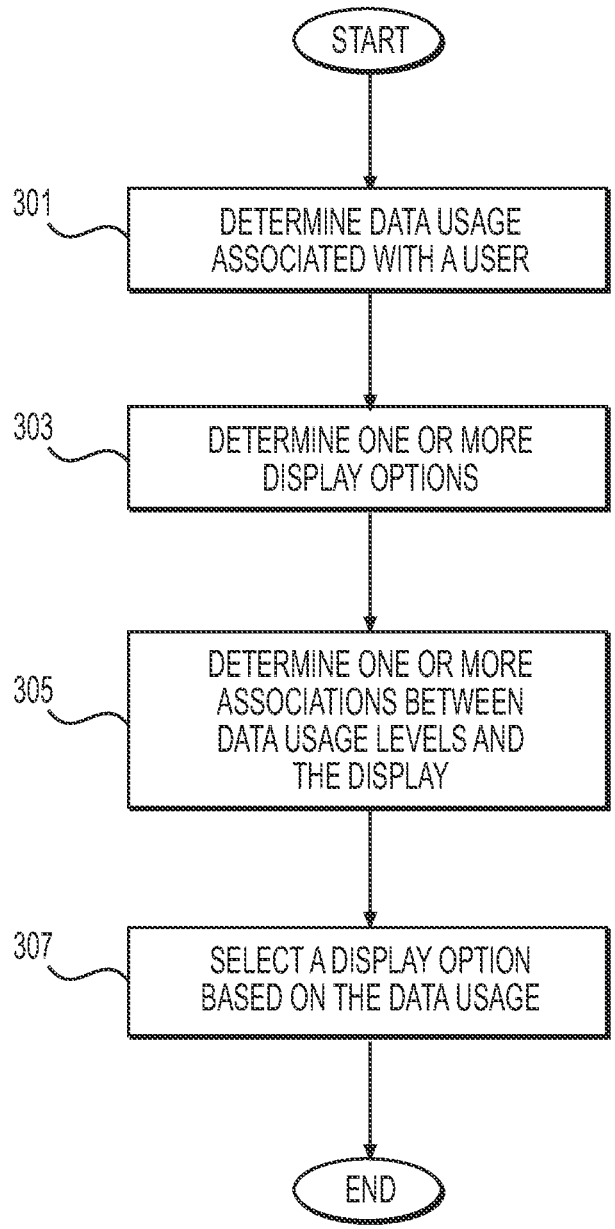
FIG. 3 is a flow diagram of an exemplary method 300 for selecting content display according to data usage, according to an exemplary embodiment of the present disclosure.

FIG. 3 is a flow diagram of an exemplary method 300 for selecting ad content to display according to data usage, according to an exemplary embodiment of the present disclosure. As shown in FIG. 3, method 300 may involve determining data usage associated with a user (step 301). For example, control logic 201 may receive information from the services 109 and/or consumers 103 that monitor data usage. The control logic 201 may further determine one or more display or presentation options for displaying ads (step 303). For instance, content providers 111 may provide videos, single images, images that may expand or have different views, content renderings of various sizes, shapes, and layouts, etc. on a user interface. Next, the control logic 201 may determine one or more associations between data usage and the presentation options (step 305). Lastly, based on the associations, the control logic 201 may select a presentation option for displaying content based on the data usage (step 307). For instance, higher data usage may correspond to more obtrusive, larger, more persistent, and/or more frequent ad display.

Figure 4:
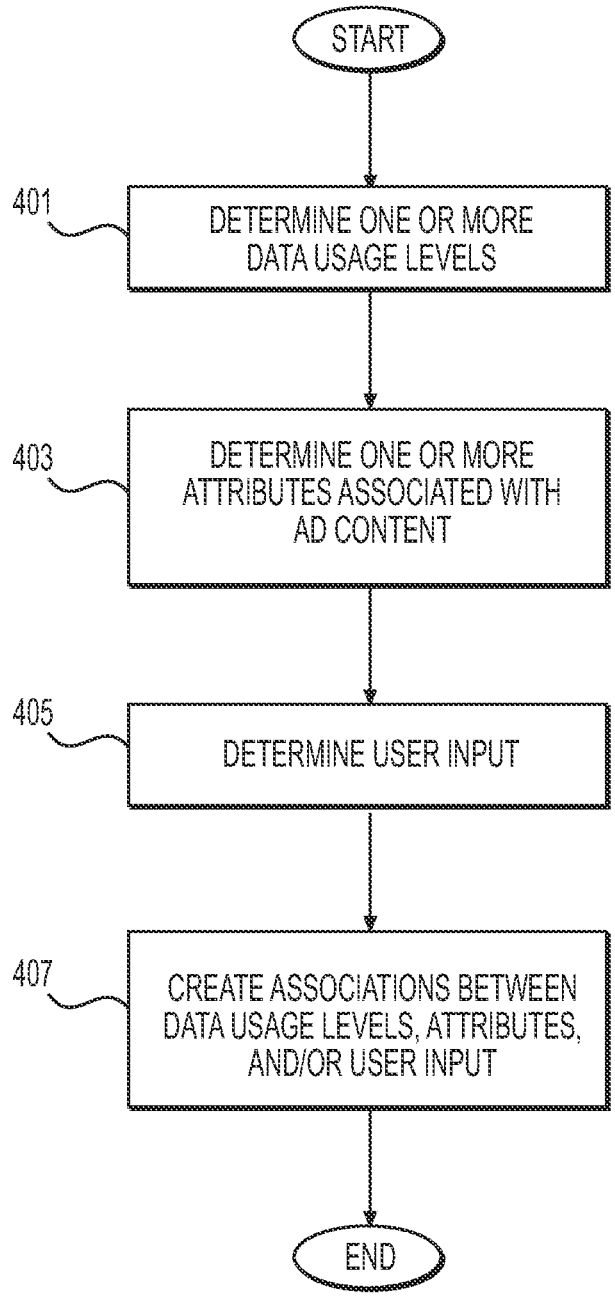
FIG. 4 is a flow diagram of an exemplary method 400 for creating associations that underlie selection of content attributes for display according to data usage, according to an exemplary embodiment of the present disclosure.

FIG. 4 is a flow diagram of an exemplary method 400 for creating associations that underlie selection of content attributes for display according to data usage, according to an exemplary embodiment of the present disclosure. As shown in FIG. 4, method 400 may involve determining data usage in terms of data usage levels (step 401). Data usage levels may be defined by thresholds. For example, in one embodiment, control logic 201 may further determine attributes associated with content (step 403). For example, some content may be more obtrusive than other content. A long video advertisement is perhaps more obtrusive than a small, static advertisement. Step 403 may include determining various attributes that may characterize ad content, assigning attributes to ad content from content providers 111, and grouping ad content based on the attributes. As an additional factor, method 400 may incorporate the control logic 201 determining user input, including user interaction with displayed content (step 405). For example, if a user clicks on a displayed advertisement or makes a purchase based on a displayed advertisement, control logic 201 may permit an upgrade in data usage allowance without changing attributes for content display. Lastly, the control logic 201 may create associations between the data levels from step 401, attributes from step 403, and user input from step 405 such that levels of data consumption paired with user input information is associated with certain content attributes for display.

Figure 5:
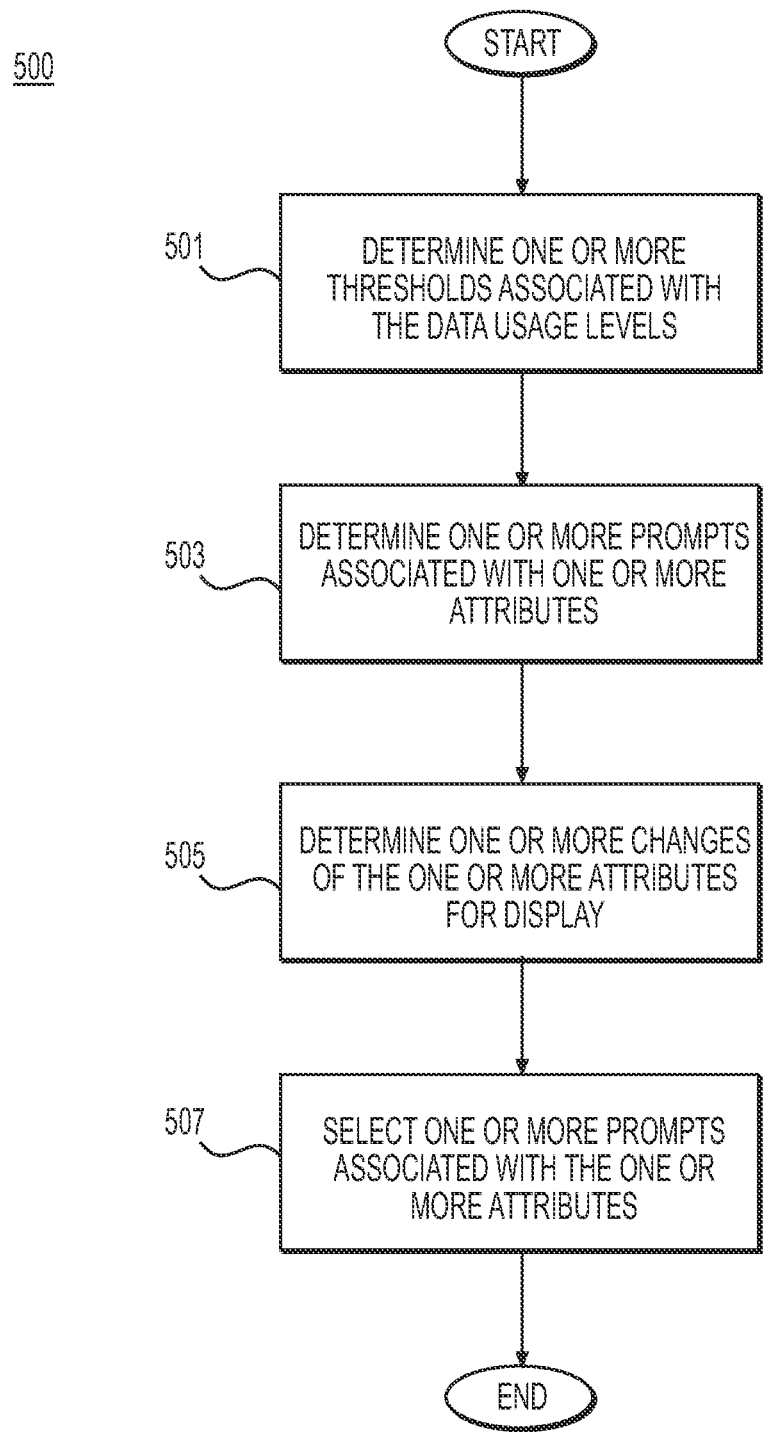
FIG. 5 is a flow diagram of an exemplary method 500 for selecting and receiving prompts prior to changing content attributes for display according to data usage, according to an exemplary embodiment of the present disclosure.

FIG. 5 is a flow diagram of an exemplary method 500 for creating prompts prior to changing content attributes for display according to data usage, according to an exemplary embodiment of the present disclosure. For example, the prompts may actively inform a user that their user experience may change due to their data consumption outside of the data allocation limits of their data plans. The prompts may further propose alternate data plans, request a user to enter or select ad formats she would prefer (e.g., in exchange for the data usage), permit a user to refrain from engaging in data consumption outside of her data plan, etc. As shown in FIG. 5, method 500 may involve control logic 201 determining threshold quantities of data that delineate between usage levels (step 501). Then, user interface modules 105, content providers 111, and/or control logic 201 may determine one or more prompts associated with ad attributes (Step 503). Step 505 may involve determining when to initiate a prompt. For example, control logic 201 and/or services 109 may determine that usage levels are nearing the thresholds determined from step 501. Then, a prompt may be desired since attributes for display may change with a usage level change. Based on the determination, control logic 201 may select one or more prompts to display, which are associated with the ad attributes associated with the usage levels relevant for the change (step 507).

FIG. 6 depicts user interfaces showing static and dynamic ad display, according to an exemplary embodiment of the present disclosure. Diagram 600 may include a home screen. A user may select to open an app or browser or to access a website that requires a data plan upgrade for the user to display. Prior to loading the app, browser, or specific website, interface 620 may appear to show a video content item. In one embodiment, the display of interface 620 may include the duration 621 of the content item display (e.g., "Your browser will launch in 15 seconds"), as well as option buttons 623 for a user to interact with the content item (e.g., options to "shop" or "purchase"). As shown in interface 620, the duration 621 for display may be different from the length of the ad itself. Here, the length of the content 625 may exceed length of the display. Upon user interaction or reaching the end of the length of the display, a user may be presented with interface 640. Interface 640 may be an exemplary illustration of ad content that may involve data consumption outside of a user's original data plan. In this case, a user may watch or interact with the advertisement content in interface 620 in exchange for a data plan upgrade that allows completion of the user's request for content (interface 640).

Figure 7A:
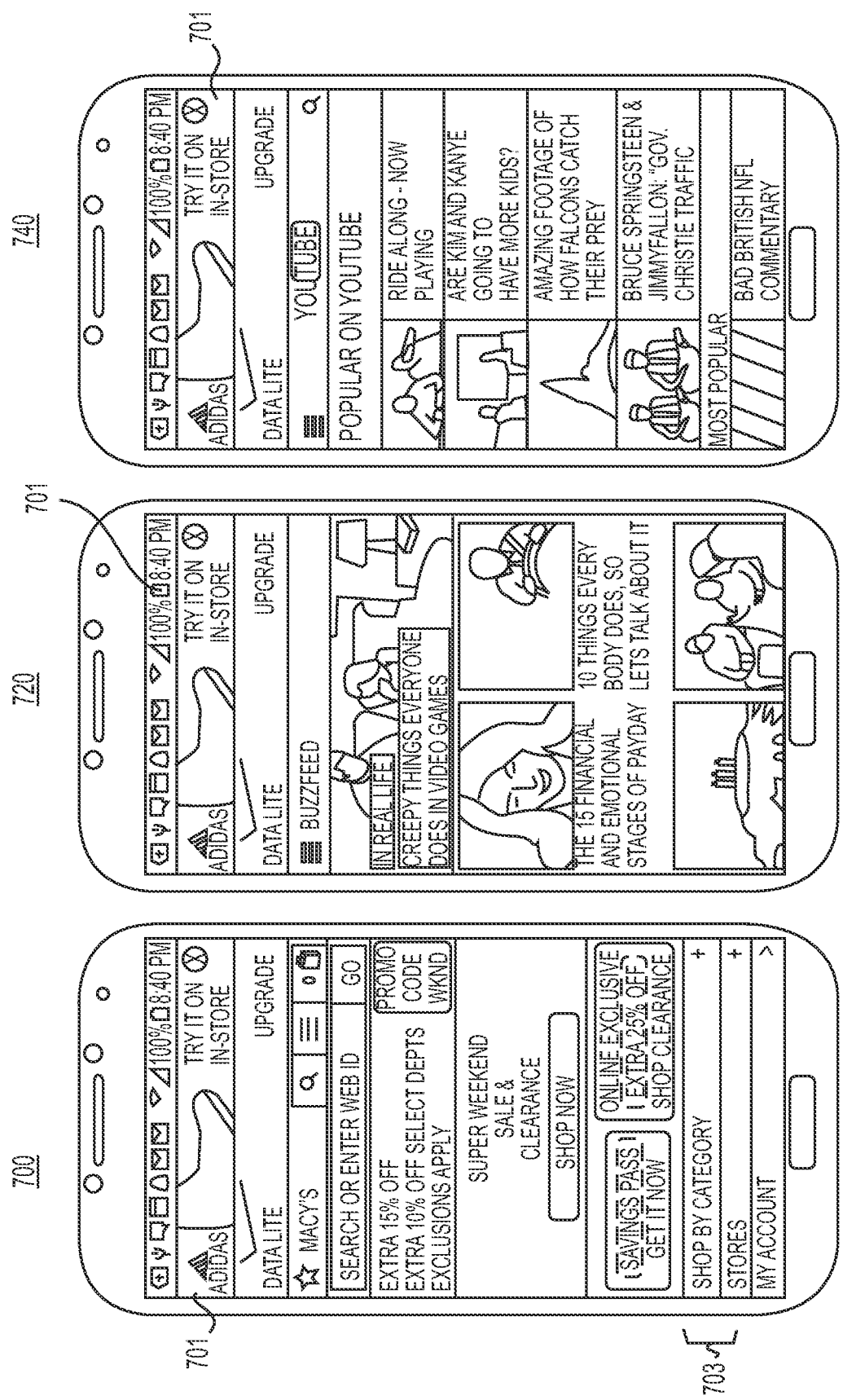
FIGS. 7A and 7B include diagrams of user interfaces showing static or dynamic content display, according to an exemplary embodiment of the present disclosure.

FIG. 7A depicts user interfaces showing static and dynamic ad display, according to an exemplary embodiment of the present disclosure. As seen between interfaces 700, 720, and 740, a static banner 701 of content may be built into the user interface. For example, banner 701 may remain as part of a browser as a user navigates the Internet (e.g., by navigating between web pages shown in interfaces 700, 720, and 740). Banner 701 may be an instance of ad display associated with data consumption lower than data plans that activate dynamic displays. Banner 701 may also vary in size depending on data usage levels.

In addition, interfaces 700, 720, and 740 may include an option to minimize ad displays for a certain duration. For example, collapsed content 703 may be "pushed down" for five seconds, then pushed up at the conclusion of the five seconds. In some embodiments, the duration may be pre-set and static. For instance, the five seconds may be pre-set. In other embodiments, the duration may fluctuate according to data usage and/or a data plan. For instance, a high amount of data usage may cause ads to be minimized for a shorter period of time, whereas low data usage may permit ads to be less prominent and surface only after a longer period of time.

Minimizing content may include a display where the content appears collapsed or "pushed down," for example, collapsed content 703. In some cases, content 703 may be maximized, either automatically after a given time or upon user interaction. The content 703 may be maximized, either if a user's data usage continues at the same rate or if a user does not interact with the content 703. Although interfaces 700, 720, and 740 show exemplary displays where content 703 may be independent from banner 701, banner 701 and content 703 may also be combined. For example, banner 701 may be a minimized (e.g., pushed down) form of content 703 or vice versa.

In one embodiment, content 703 may change if it is pushed down for a given amount of time. For example, if a user continually does not interact with content 703 or content 703 remains pushed down, the lack of interaction may be taken as a lack of user interest in content 703. Then, content 703 may be exchanged for some other content or ad after a certain amount of time.

Figure 7B:
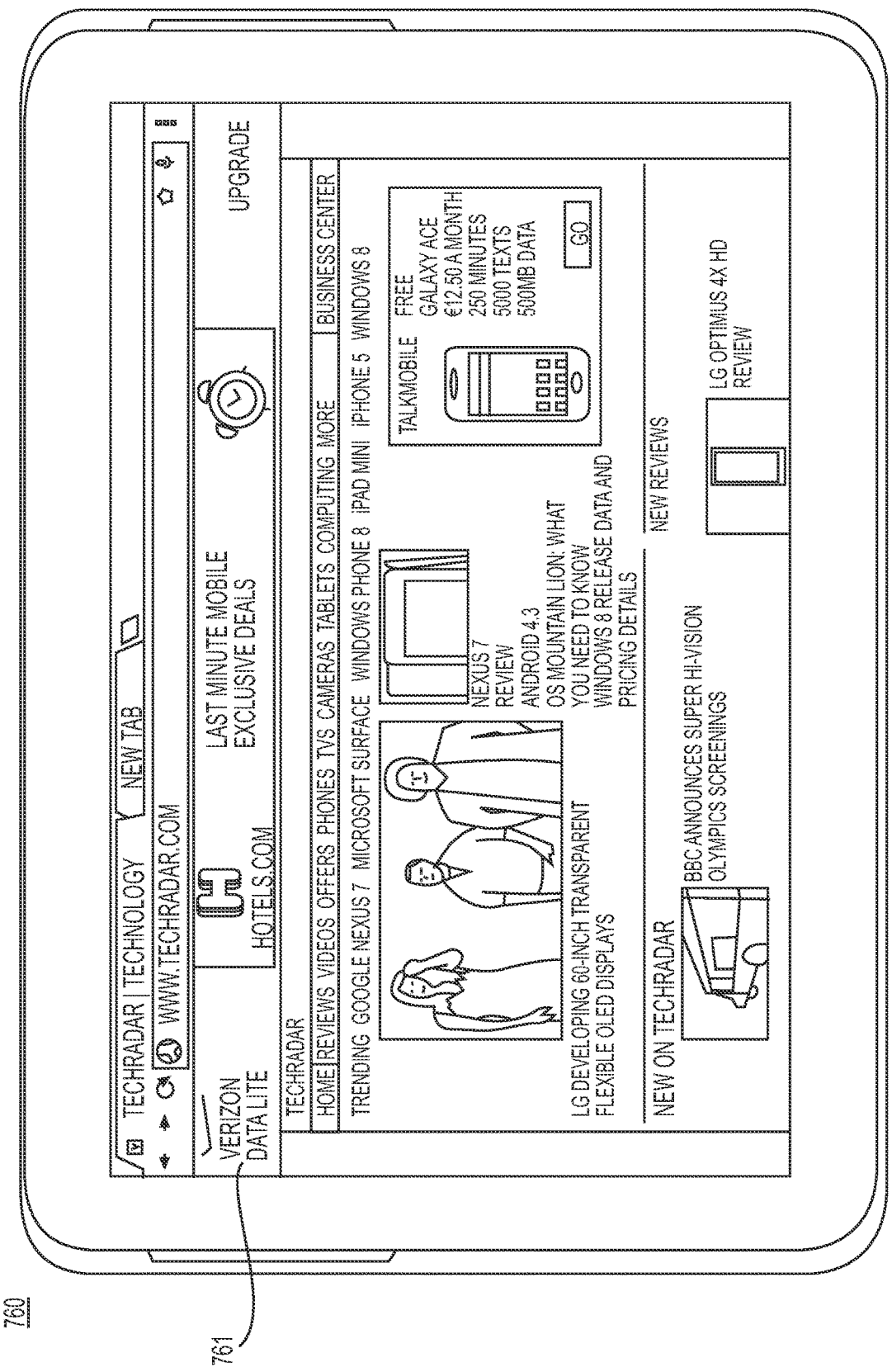

FIG. 7B depicts a user interface associated with a mobile device that is typically not associated with services 109, according to an exemplary embodiment of the present disclosure. For example, interface 760 includes a user interface for a tablet device. Tablets currently employ data plans to a lesser degree than mobile phone devices and tablet usage is generally not conducted over a carrier connection. Nevertheless, the system in environment 100 may still incorporate devices like tablets as part of the consumer devices 103a-103n. For example, tablets that do not yet have data plans activated may be detected. Then, exemplary interface 760 may be presented, allowing users to opt into an ad-supported data plan. Banner 761 may one exemplary presentation of an advertising or content display unit for such devices as a user browses the Internet. Furthermore, environment 100 may determine when tablets may switch away from network 101, which supports ad-supported data plan. For example, environment 100 may detect tablets (or any consumer devices 103a-103n) that are using Wi-Fi (e.g., home Wi-Fi), whereupon environment 100 may disable ads from an ad-supported data plan.

FIGS. 8A-11C may include user interfaces displaying ad content on a locked screen. In one embodiment, the user interfaces shown in FIGS. 8A-8D are not specifically associated with a particular service or goods provider. Any sponsored content may be displayed on the user interfaces of FIGS. 8A-8D. In one embodiment, the user interfaces shown in FIGS. 9A-11C promote or include lock screens specifically designated to a particular service or goods provider. In other words, the service or goods provider may have exclusive access to and use of the user's lock screen. In some embodiments, this may mean that the service or goods provider may offer in-app installations or purchases specific to the service or goods provider. The following description explains each of these exemplary user interfaces in more detail.

Figure 8A:
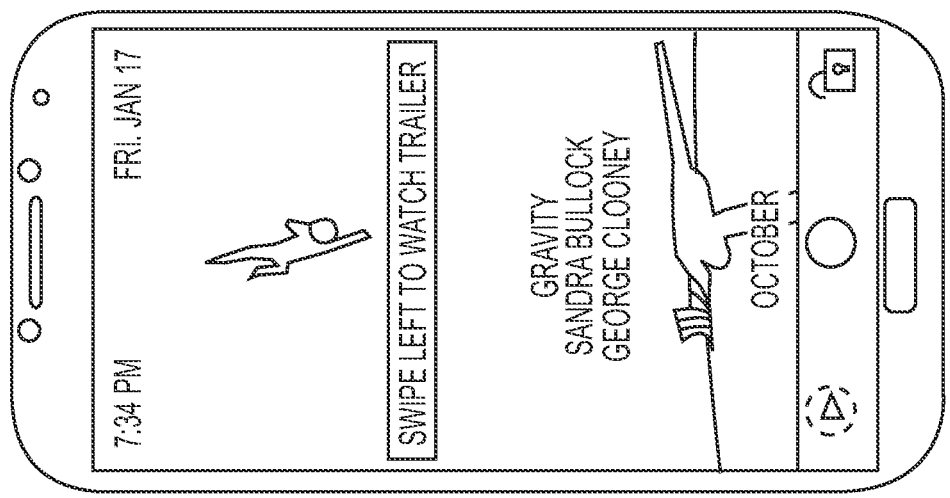

FIGS. 8A-8D depict user interfaces from a locked screen, according to an exemplary embodiment of the present disclosure. For example, one type of content display may include ad content shown as a user turns on or unlocks a phone. Interfaces 800, 820, 840, 860, 861, 863, and 865 are possible ad display types for a user to see upon unlocking a phone. Different interaction with the ad display may possibly trigger different initial data plans for when the user starts using a device. For example, a user may have the choice of swiping to the left to interact with the content displayed or swiping to the right to proceed to using their device. Interacting with the ad displayed may set the device to a higher data plan so the user will not be interrupted with content until consumption exceeds or falls below certain usage levels. Alternately, skipping the interaction may set the device to a lower data plan so that ad display is again triggered if a user wishes to open an application or browser. In one embodiment, interface 800 of FIG. 8A may present a static display from a locked screen, where a user may choose or be presented with different subsequent displays, depending on his or her interaction with the interface 800. For example, swiping left on interface 800 may prompt a display of dynamic ad content (e.g., playing a trailer directly on the lock screen, directing a user to a website to view the trailer, and/or presenting a video display of the trailer that occupies an entire screen), while swiping right may permit the user to circumvent ad displays for some amount of time. As shown in FIG. 8B, interface 820 may be another exemplary user interface displaying a single advertisement. Interface 820 may include element 821 that may allow a user to interact further with ad provider content. For example, element 821 may permit a user to install an app related to an ad provider. In further embodiments, element 821 may also take a user to a webpage and/or mailing list that may subscribe a device to future notifications relating to the ad. Interface 800 of FIG. 8A and interface 820 of FIG. 8B both show exemplary single advertisements on the locked screen.

FIG. 8B further includes interface 840, which depicts a "wall" advertisement display, according to an exemplary embodiment of the present disclosure. For example, interface 840 may include several elements 841, displayed concurrently. Each of the elements 841 may permit a user to further interact with ad content associated with content of respective elements (e.g., installing an app, reaching a website, etc.). In one embodiment, swiping in one direction across elements 841 may prompt further interaction with ad content, while swiping in another direction may permit a user to scroll down a list of elements 841. For example, a user may swipe right, across one of the elements 841 to play ad content. Alternately, a user may scroll in a downward direction to see more elements 841 and/or to repopulate elements 841 displayed on the wall. Furthermore, a user may have the option to select multiple elements 841 to interact with. For example, a user may select various elements 841 and download apps associated with those elements 841 all at once. Such an interaction may also update an ad-supported data plan so that a user is given an allotment of uninterrupted data usage in return for his or her interaction with the ads. In another instance, a user may save or store certain elements 841 to his or her wall advertisement display, perhaps as a reminder. For example, a user may wish to keep an ad for a movie on her interface to remind herself and easily access movie times and theaters.

In one embodiment, a wall display of interface 840 may be associated with a user's data usage and/or user preference or selection. For example, interface 840 may include more elements 841 as a user's data consumption increases past certain thresholds, whereas elements 841 may be fewer where a user may be on a lower data plan. The number of elements 841 per interface 840 may fluctuate with a user's data usage. In another embodiment, a user may select his preferences for interface 840. Especially as elements 841 increase, interface 840 may include several options for displaying the elements 841. For example, elements 841 may be in the form of tiles, windows of various sizes, tickers, or any other desired display options.

Figure 8D:
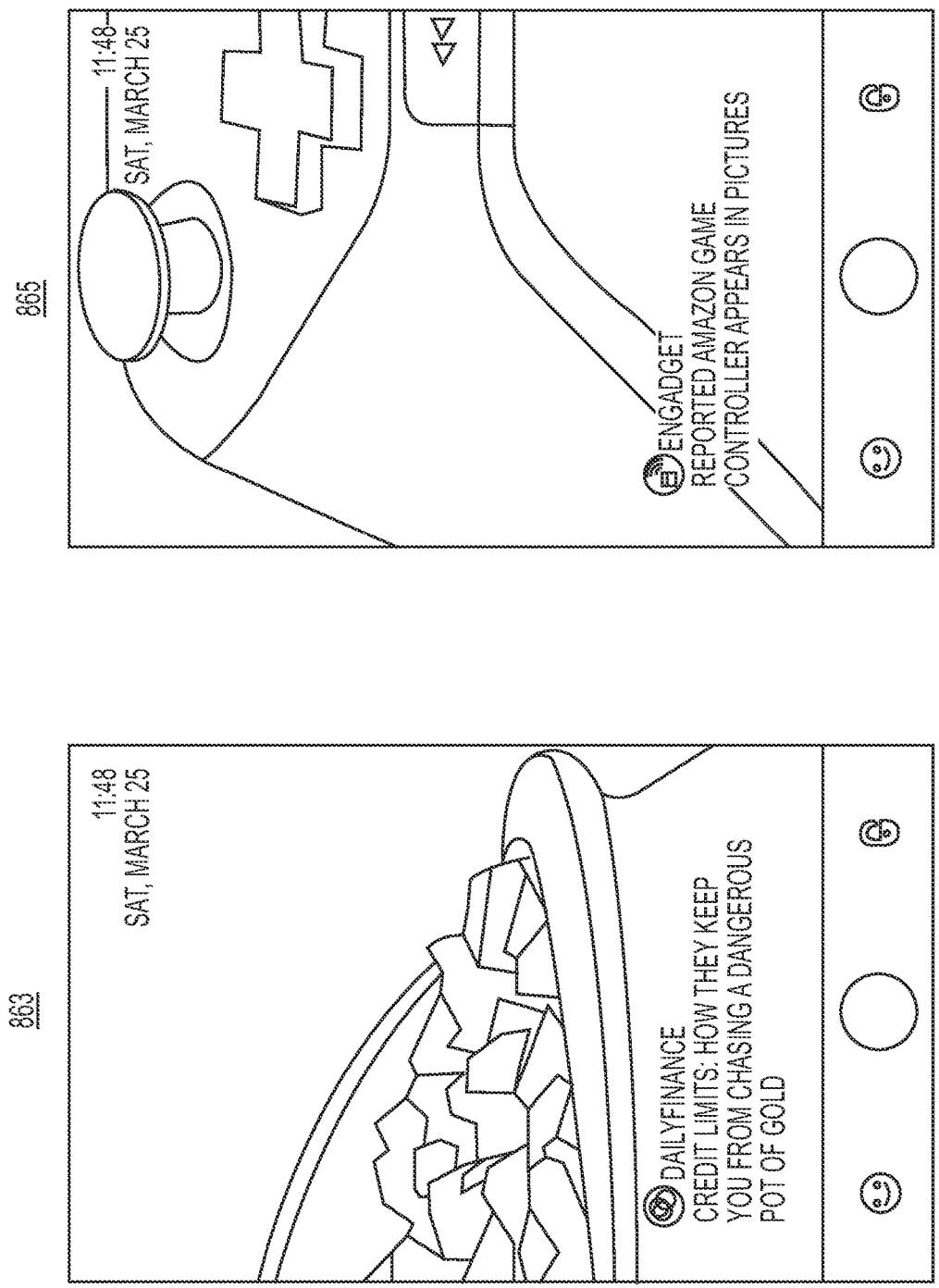

FIGS. 8C and 8D include interfaces that may intersperse content into lock screen views, according to an exemplary embodiment of the present disclosure. For example, interfaces 860, 861, 863, and 865 may display content, including news, articles, headlines, etc. at the lock screen. For example, the display content may include a live broadcast or stream of headlines, e.g., shown in the interfaces 860, 861, 863, and 865 in a display format including the words, "cast by", a sponsor source, and a headline. In one embodiment, the content may be derived from user subscriptions to the content providers. Alternately or in addition, content populating the lock screen views may also be based on user preferences, past user activity, projected user interests, etc. Content may further include any content and/or activity useful to a user, for example, tracking for packages, traffic information, nutrition or fitness tracking, monitoring for spending habits, etc.

FIGS. 9A-11C depict additional user interfaces from a locked screen, according to an exemplary embodiment of the present disclosure. Specifically, these user interfaces may be included in an exemplary embodiment, where a lock screen display may be associated with a specific vendor (e.g., a content provider, retailer, or app). For example, the vendor custom lock screen may be used by a vendor to engage a user. In one embodiment, an app may prompt a user to activate a custom lock screen (by clicking a user interface button), in exchange for a benefit within the app. For instance, the custom lock screen may be used to convey goods, services, promotions, discount, game credits, credit to download apps, reward points, or any other form of quantifiable value to a user. Such lock screens may include app notifications (or notifications from a collection of apps, for instance, dictated by the user), cross promotions (e.g., promotions or discounts for associated vendors or apps), advertisements, articles or headlines, weather forecasts, custom or personalized notifications set by the user (e.g., health statistics provided by wearable technology, personalized news feed, notifications from particular sources, etc.), customizable background images, etc. Once the user elects to activate the lock screen, a custom app lock screen may appear. In some embodiments, the benefit within the app may be conveyed to the user only if user interaction with the custom lock screen reaches or exceeds a minimum threshold interaction. For example, vendors or service/goods providers may determine or set a minimum user interaction threshold (e.g., a minimum number of monthly lock screen or ad views, custom lock screen installation lasting at least 30 days, etc.). The vendors or service/goods providers may then cease to convey a promised benefit to a user if user interaction with the custom lock screen falls below the minimum user interaction threshold. The vendor lock screen may include a lock screen software development kit (SDK) integrated into an app.

Content providers in these cases may refer to a single goods or service vendor, or a collection of vendors. For example, custom lock screens may include cross-vendor or cross-app credit and promotions. For instance, a publisher may have several associated mobile game apps (e.g., vendors). Game credits could be used for any mobile game app belonging to the publisher. In other words, game credits earned in one game may be applied to another game associated with the same publisher. Then, a custom lock screen may include an offer to prompt a user playing one mobile game to install a new game (belonging to the same publisher), in exchange for receiving game credit that can be applied to either the current mobile game, or the new game. This same model may also work across several content providers. For example, a group of publishers may accept the same virtual currency across their applications, so virtual currency earned in one app of one publisher may still be applied to another app in another publisher that is joined in the same group of content providers. In one case, common display icons or elements may be included for custom lock screens associated with vendors belonging to a collection of vendors. For instance, custom lock screens for all the mobile game apps belonging to one publisher may include a display incorporating a logo or trademark associated with the publisher. In other words, vendors may customize a look and feel of a custom lock screen experience to tailor their branding or permit a user to easily recognize an app or group of apps as being associated with one another.

In some instances, the value to the user may be provided to a user in exchange for permitting a content provider to display or provide sponsored content via the user's lock screen. Exemplary offers in exchange for use of a lock screen may include one or more of accessing a subscription service at a discounted rate, receiving a dollar amount and/or number of credits for in-app purchases, unlocking of premium content for free or at a discount, providing a certain amount of lives in games for free, offering tools within the games (e.g., weaponry or armor), etc. One exemplary case may include offering a discount on a subscription service, in exchange for a user installing or using a custom lock screen of an app offering the subscription service. Further detail for this case is provided in FIG. 9A. Another exemplary case may include offering some form of game credit or currency in exchange for a user installing or using a custom lock screen provided by a mobile game. Further detail for this case is provided in, for instance, FIGS. 9B-10B.

In one embodiment, prompts or offers to install or use custom vendor lock screens may be presented at various times. For example, apps or service/goods providers may dictate or adjust the timing at which an app presents such an installation prompt or offer. In one embodiment, prompts could be presented when a user has been inactive in an app for a pre-set amount of time (e.g., more than two weeks of inactivity). Alternately or in addition, a prompt may be presented when a user has run out of lives in a mobile gaming app, for instance, and the user wishes to continue playing. Similarly, a prompt may appear when a user wishes to get to a next level within a game or expedite a portion of the game. For example, a game may include a feature in the game storyline including construction of a building. The game app may present a prompt or promotion offering to expedite the construction of the building in exchange for the user acquiring an in-app purchase (e.g., virtual currency in the context of the game, virtual currency available across games available on a certain platform, a custom game lock screen, etc.).

Prompts may also be presented when a free trial is about to end, for instance, when a user wishes to continue playing a game or continue using a service, but switch to the free version of the game or service rather than a paid subscription version. In yet another instance, a prompt may be linked to social media or social networks. For example, a prompt to install a lock screen may appear for a user whose social network friend or contact has installed the lock screen. Alternately or in addition, users may recommend or suggest that their friends or contacts install a lock screen, thus causing a lock screen installation prompt to appear for those friends or contacts. A custom lock screen installation option may also be presented upon installation of an app. For instance, a user may download an app from a desktop computer, tablet, or mobile online advertisement. In one case, an app lock screen or app lock screen installation prompt may be presented to the user, the first time the user opens the app. Generally, custom lock screen displays may take into account multiple variables to engage users and maximize value to users. Such variables may include frequency of reward, timeliness of a reward (e.g., so as to not interrupt a user or be obtrusive for a user experience), quantity (e.g., appropriate benefit conveyed to user), demand or popularity of a vendor (e.g., a popular game may offer less incentive for a user to install a custom lock screen, while a new game or less popular game may present a higher offer to a user, in order to promote the game), assortment of content (e.g., displaying a custom lock screen may including one or more articles, app notifications, ads, cross-promotions, etc. in a combination that suits a user), etc.

In one embodiment, multiple custom lock screens may be installed. In such a case, the display for the multiple lock screens may be represented by different content ratios, meaning the ratio that the custom lock screen occupies, relative to other custom lock screens or relative to the entire available display screen surface. For example, a user may directly or indirectly (e.g., through user interactions or behavior) select what percentage of a lock screen view gets allocated to which custom lock screen.

In some embodiments, user behavior may influence custom lock screen display or function. For example, the content ratios may be dynamic based on user behavior. For example, a custom lock screen that a user interacts with more often, may occupy a larger content ratio or display space on the user's screen. User behavior may also help determine the content that may be displayed on a custom lock screen. For instance, a custom lock screen may include multiple ads if a user does not frequently open her phone. Alternately, if a user appears to rarely interact with ads, the custom lock screen content may focus more on cross promotions, so that lock screen display may be more effectively targeted for the user's behavior. As stated before, custom lock screens may further include notifications or display news items. In one embodiment, user behavior may dictate custom lock screen display of notifications and news items. For example, a user's past engagement and clicks on specific articles or topics may cause notifications or news items related to those articles or topics to be displayed to the user.

Another way that user behavior may affect custom lock screen display or function, may include different offers, depending on user behavior. For example, a vendor may convey a higher benefit or "payout" (e.g., virtual currency in a mobile game app) for a user who frequently uses the custom lock screen. For instance, a user who views a custom lock screen 120 times or more per day may be offered $15 of game credit, a user who views the custom lock screen 80-119 times per day may receive $10 of game credit, and a user who views the custom lock screen less than 80 times per day may be offered $5 of game credit. In other words, the promotions offered by vendors via a custom lock screen, may vary or fluctuate based on user behavior or benefits derived from user behavior.

In a further embodiment, a user may actively affect the interplay between user behavior and promotions delivered to the user. For example, a user may select a higher ratio of ads to be displayed on his custom lock screen, in exchange for a higher benefit or "payout" (e.g., virtual currency in a game app). In other words, a vendor may provide transparency in how user interaction with a lock screen may correspond to a benefit the user may receive in exchange for his interaction. The user may then interact with the lock screen according to the benefit he wishes to derive from the vendor. In another instance, a vendor may increase payout in exchange for the user installing related apps or products from related vendors (e.g., apps by the same publisher). For example, a publisher "X" may be associated with several mobile game apps. A user with a custom lock screen for one of the mobile game apps belonging to publisher X may receive a payout for installing another game app that belongs to publisher X.

Additionally or in the alternative, a user may permit sponsored content display on a lock screen, in exchange for data plan upgrades, for instance. In other words, user interaction with benefits provided from a lock screen may be considered interactions that may update an ad-supported data plan. For example, a plan may permit a user uninterrupted data usage, high-speed capabilities, and/or a given allotment of data usage, depending on his installation of an app-related lock screen. While all the embodiments thus far may include ad content that takes into account a user profile or user preferences, the exemplary lock screens of FIGS. 9A-11C may be used to provide targeted advertising and/or content to users specifically based on a user's activity with a service or goods provider (e.g., FIGS. 9A and 11A-11C) and/or a mobile app (e.g., FIGS. 9B-11C).

Furthermore, custom lock screens may be equipped with anti-fraud tools. For example, apps may detect when an associated custom lock screen is repeatedly uninstalled and/or deactivated within a certain time period (e.g., where a user may attempt to continually receive a payout by uninstalling and reinstalling a custom lock screen). For instance, an app may detect that a user under the same app profile identifier is uninstalling and reinstalling a custom lock screen. Upon detection of such behavior, the app may cease offering the payout or request that the user wait a set time period before attempting to re-install the custom lock screen. In one embodiment, a custom lock screen may include recording a particular user device identifier and app profile identifier to track user behavior and ensure that the exchange of benefits for installation of a custom lock screen is used appropriately. Furthermore, a user date and time of interaction may be pulled from a central server (rather than from a local phone device) to avoid a situation where users may manipulate the time settings in a device to uninstall and reinstall the custom lock screen within the set period of time.

In one embodiment, a custom lock screen may further include a display of metrics associated with a vendor for the custom lock screen. For instance, a vendor that is a mobile game app may display a credit balance, ranking, or game lives on the custom lock screen. A vendor that is a social network app may include notifications of status updates within the social network or notifications of feedback on the user's content (e.g., sharing, re-posting, or "like"-ing, etc.).

Figure 9A:
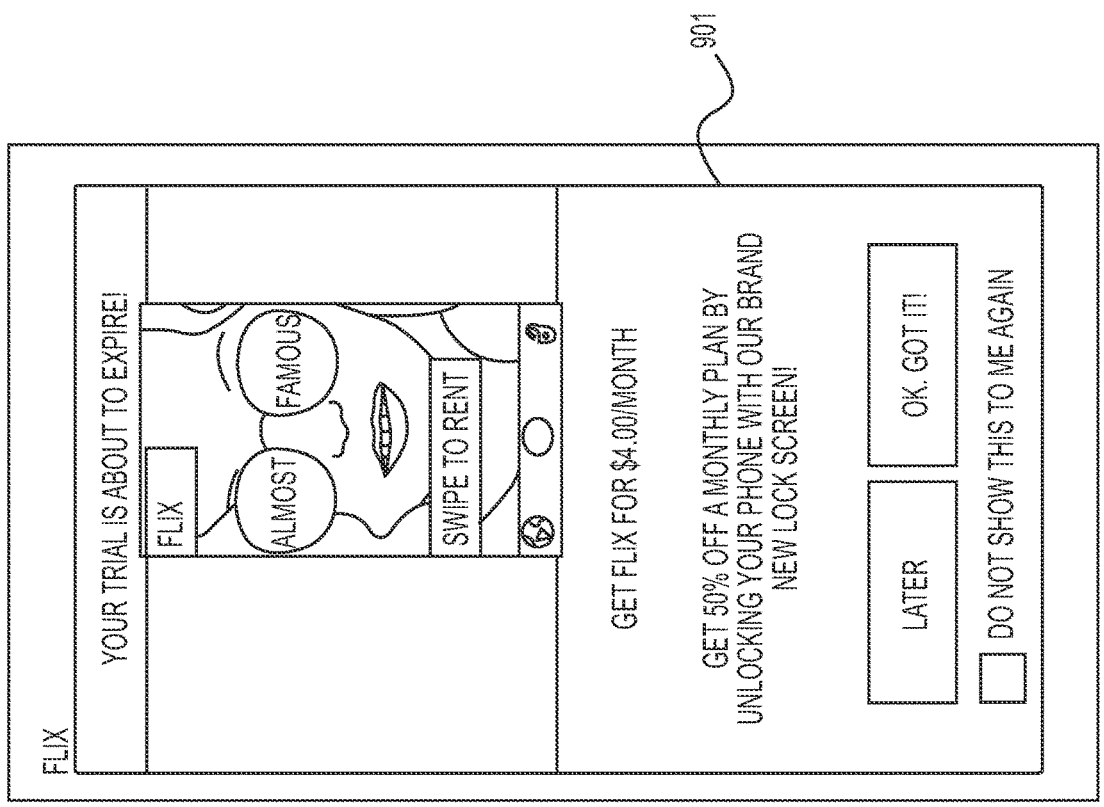

FIG. 9A depicts user interface 900 from a locked screen, according to an exemplary embodiment of the present disclosure. In one embodiment, interface 900 may include a lock screen related to a service or goods provider. The service or goods provider may optionally be associated with a specific app. In any case, a service or goods provider may wish to display promotional content to a user, via the user's lock screen. For instance, a promotion may offer a trial subscription for at a discount from the full price of use of a subscription, in exchange for using a custom lock screen associated with an app offering the discount. For instance interface 900 may include a promotion 901, offering reduced charges for services, contingent upon downloading and using an exemplary lock screen. For example, services may include monthly subscription services, e.g., TV, online streaming services, internet access, magazines, etc. In one such case, promotion 901 may prompt a user to select discounted services (e.g., on-demand internet streaming media) in exchange for using a service-related lock screen. In one embodiment, revenue generated from custom lock screen usage may offset providers' profit loss from offering discounted services.

FIG. 9B includes interfaces that may offer benefits to a user in exchange for using an app-related lock screen, according to an exemplary embodiment of the present disclosure. In some embodiments, an app is a specific form of service or goods provider. In some embodiments, an app is a proxy or representation of a service or goods provider. Regarding app-related lock screens, potential offers may be presented within an app that is being accessed by a user. For example, in a first exemplary scenario, many popular online games are free to play up to a certain level but require purchase of credits or upgrades for more enhanced play. Accordingly, app-related lock screens may include one or more offers to receive services from a provider app in exchange for allowing the provider to display (or continue to display) sponsored content on a user's lock screen. Such an interface may be provided to a user, along with other offers of acquisition (such as paying), during or after game play. In some instances, offers may be provided after a game is finished, completion of a level, etc. Alternatively, any offers may be made periodically based on time (for example, on a weekly or monthly basis) or use (for example, every time or every fifth time that an app is accessed).

In an alternate or additional exemplary scenario, potential offers may be presented based on a user location or a user's associated contacts. For example, many online games engage several players. An interface requesting a user to permit displays at a lock screen may be presented when one of a user's associated contacts accesses a particular app, an app related to the particular app, or accepts a lock screen associated with the particular app or related app, for instance. In yet another exemplary scenario, "check-in" type mobile apps or dating apps may be linked with a user's location and social network. In some instances, potential offers may be presented within an app lock screen, allowing a user to contact (for free or for a discount) a certain number of other nearby users that may interact with the app.

FIG. 9B may include interfaces 920 and 940, which depict exemplary displays for promoting an app-related lock screen. For example, interface 920 may include user element 921, which may provide a given quantity of app-based or virtual currency, including lives, in exchange for the user using the app lock screen. Interface 940 is another exemplary display, where the display may include an overlay 941 offering a promotion (e.g., a certain amount of game credits in exchange for a user's use of an app-related lock screen or lock screen widget).

Figure 9C:
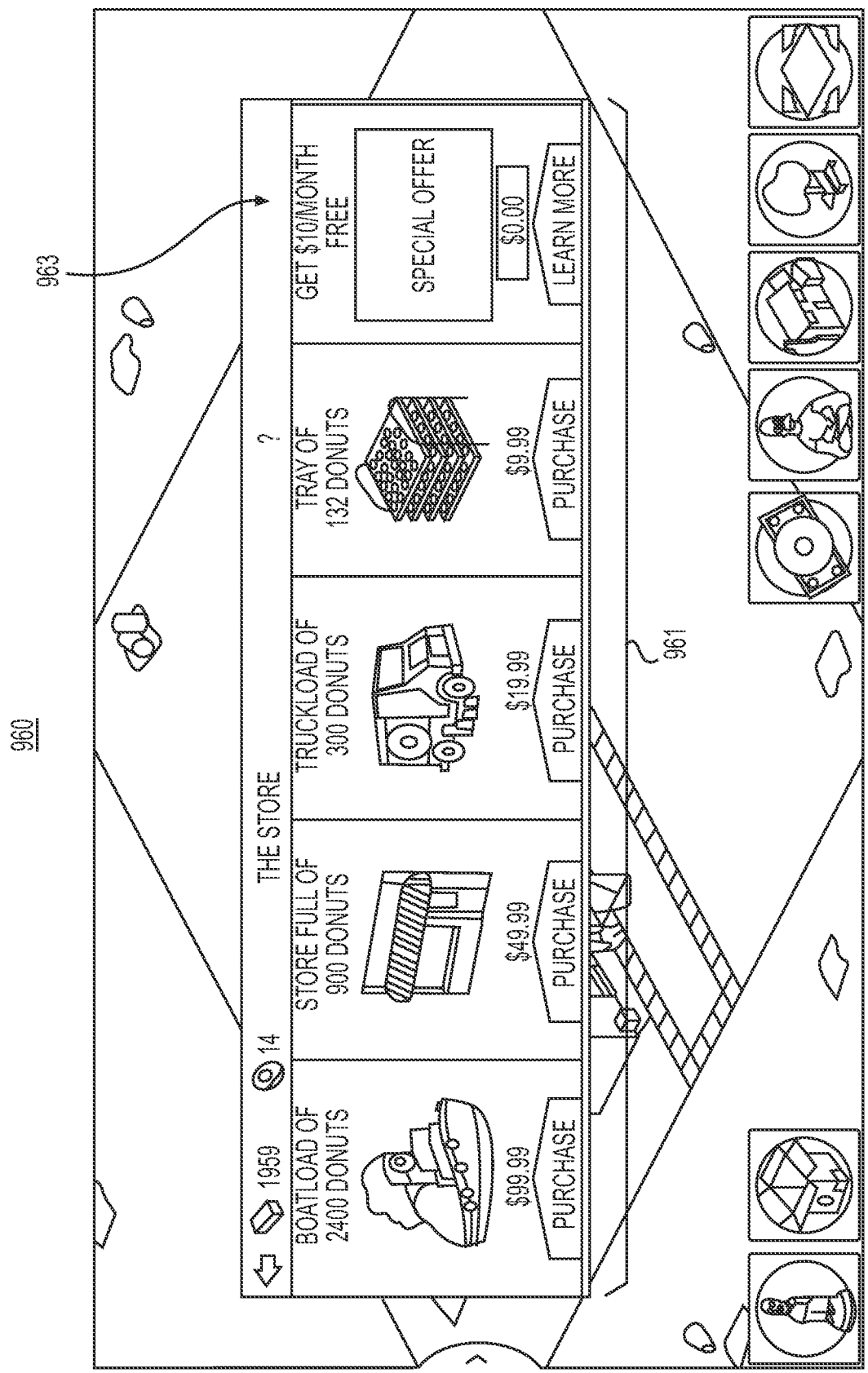

FIG. 9C may include interface 960 for promoting an app-related lock screen, in-app, as part of the app's display. For example interface 960 may include a series of options 961 within the story of a gaming app. For instance, the series of options 961 may include virtual currency (e.g., currency that game developers may offer at no cost), including the sale of credits for various amounts within the context of the game. Of the series of options 961, one option may include promotion 963, which may offer to provide a certain amount of game credits (e.g., tied to a monetary amount) in exchange for use of the app lock screen. In an alternate embodiment, promotion 963 may also present an offer for a data plan upgrade.

Figure 9D:
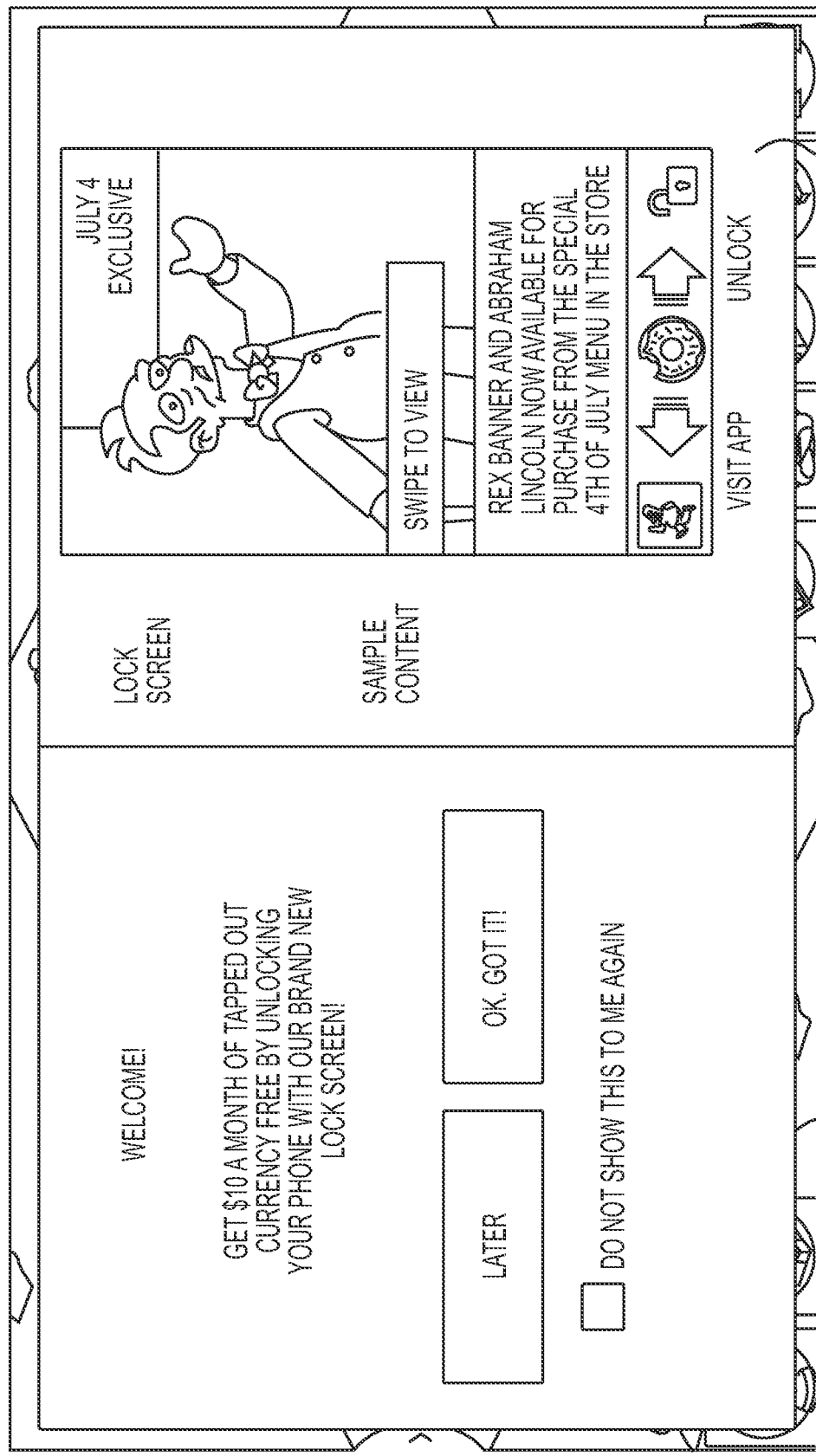

FIG. 9D may include interface 980 for promoting an app-related lock screen, where the interface 980 may include a preview display. For example, interface 980 may include promotion 981, e.g., offering to provide a certain amount of game credits in exchange for use of an app-related lock screen. Interface 980 may further include a lock screen preview 983. The lock screen preview 983 may include a snapshot of a lock screen's utility, layout, and display to a potential user.

Figure 10A:
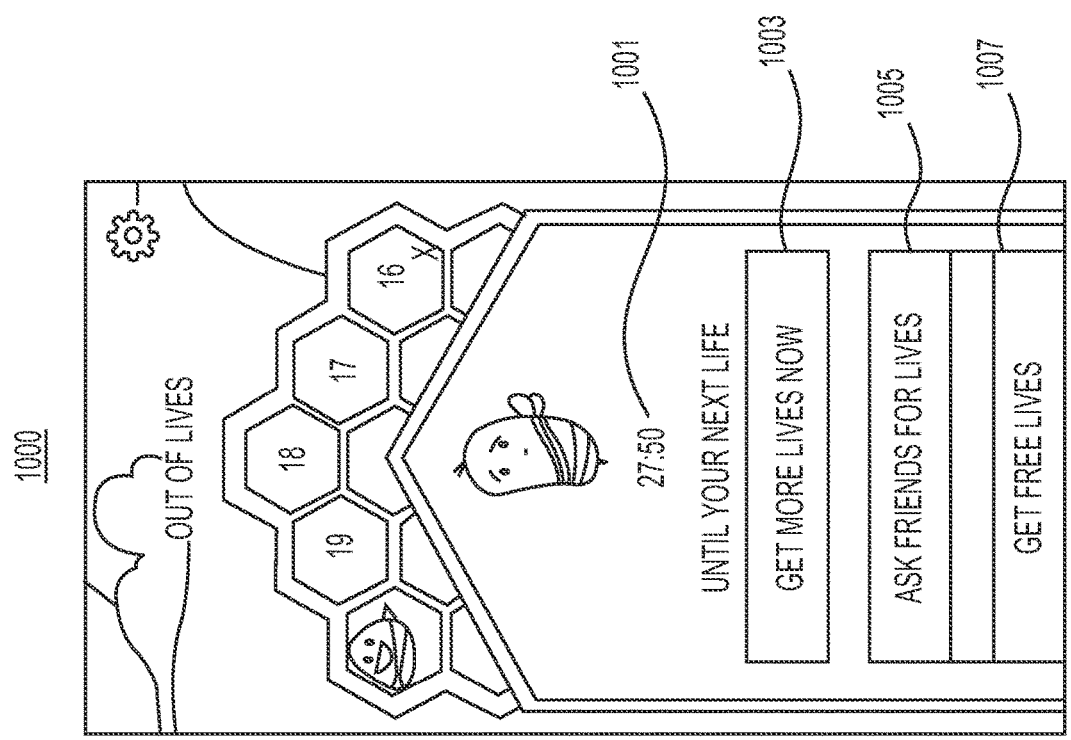
FIGS. 10A-11C are diagrams of user interfaces included in exemplary locked screens, according to an exemplary embodiment of the present disclosure.
Figure 10B:
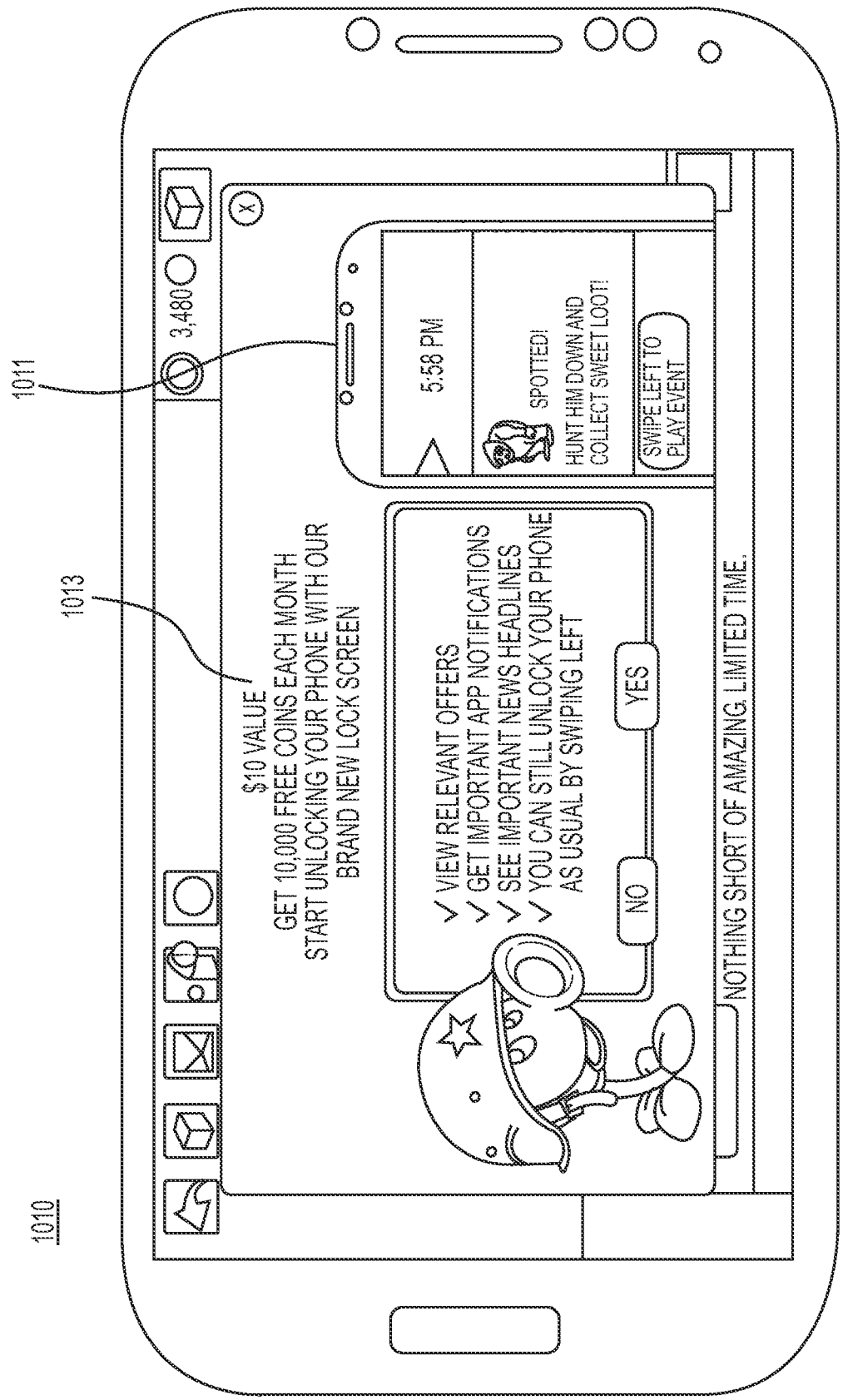

FIGS. 10A and 10B include interfaces 1000 and 1010, respectively, which may show exemplary app-related lock screens, according to an exemplary embodiment of the present disclosure. Such a lock screen may include several options for a user, for instance, directed to obtaining app-based or virtual currency, including more lives in a gaming app. For example, interface 1000 may include a countdown 1001 for a user's life span within the gaming app. Interface 1000 may further include an in-app purchase user element 1003, which may permit a user to purchase more lives. Another user element 1005 may offer the option to engage associated users, for example, permitting a user to request lives from friends. Yet another user element 1007 may offer the option to gain free lives in exchange for permitting sponsored content to be displayed on a lock screen, for instance, an app lock screen with displays specifically related to the app.

Interface 1010 of FIG. 10B may include a sample or lock screen preview 1011 that may also be interactive. For instance, a user may swipe left and directly interact with the lock screen for a trial period before installation. Interface 1010 may further include an offer 1013, showing a benefit conveyed to the user upon installation of the custom lock screen shown by preview 1011. For instance, offer 1013 may include an immediate benefit (e.g., notifications or news headlines), as well as a benefit conveyed over time (e.g., 10,000 free coins each month, in exchange for using the lock screen).

Figure 11B:
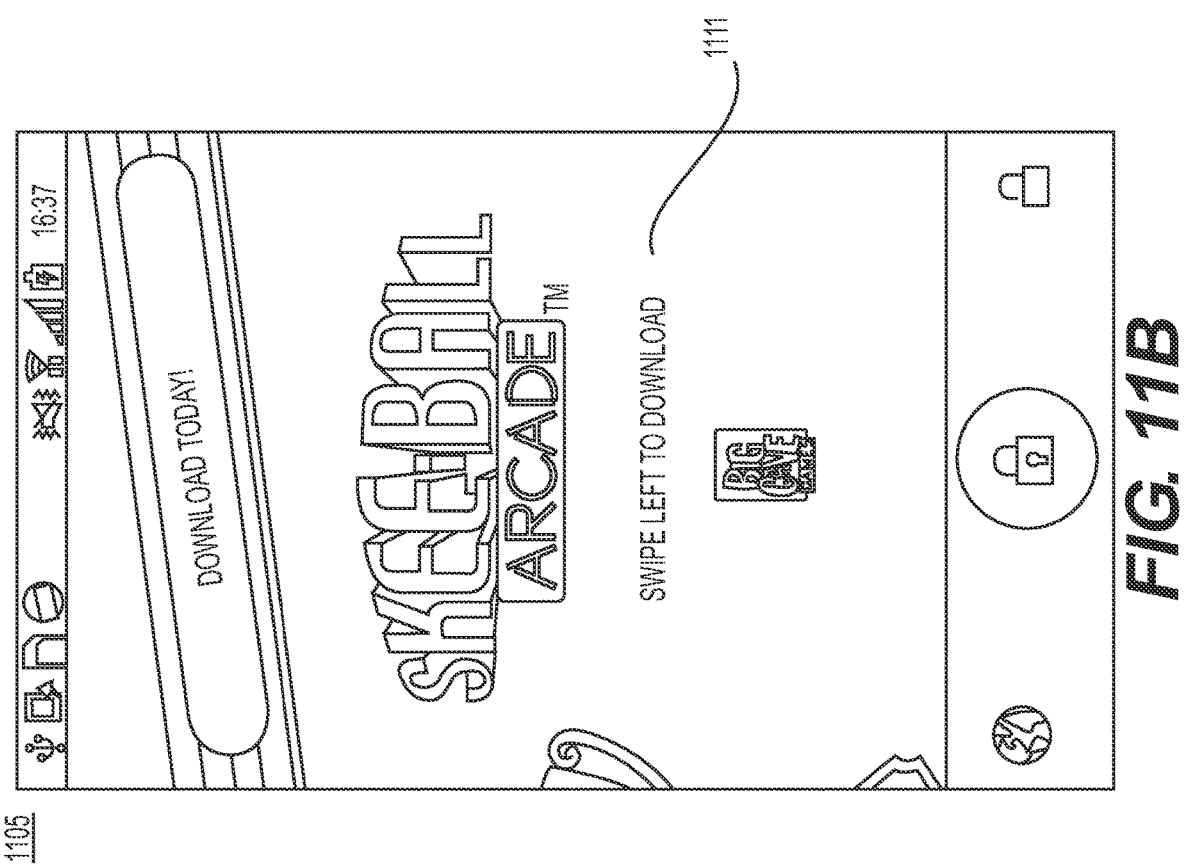
Figure 11C:
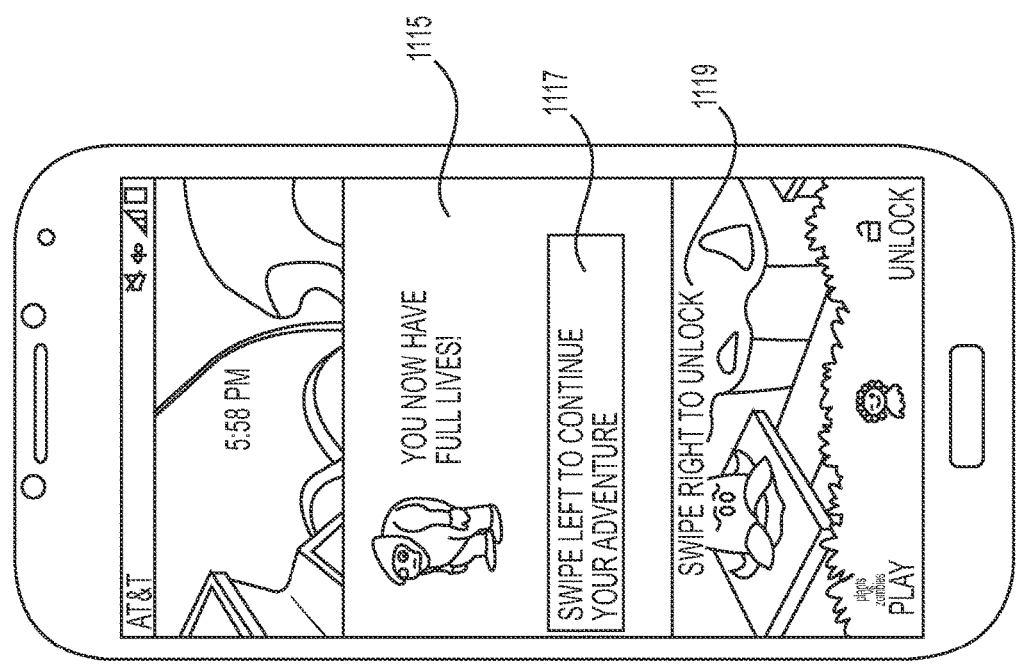

FIGS. 11A-11C depict user interfaces 1101, 1103, 1105, and 1113, respectively, involving swipe functions at lock screens associated with apps or services, according to an exemplary embodiment of the present disclosure. For example, lock screen interfaces 1101 and 1103 at FIG. 11A may incorporate swipe functions, communicated via instruction 1107 and instruction 1109, respectively, to incentivize a user to return to an app. Providing such continued promotions in ad content may encourage an individual to be a continued user of an app and/or app-related or service-related lock screen. The swipe function for interfaces 1101 and 1103 may include an option to continue with or enhance the app game. For example, interface 1103 may follow from interface 1101 in response to a swipe action. Meanwhile, interface 1105 at FIG. 11B may include a display where another product or app may be advertised in the lock screen. In the exemplary scenario displayed in lock screen 1105, offer 1111 may allow a user to download another app by swiping across the lock screen (e.g., similar to an in-app purchase).

For interface 1113 of FIG. 11C, an app may be activated directly from the lock screen. For instance, interface 1113 may include a notification 1115 that indicates to a user that he may continue playing a game. For instance, notification 1115 informs a user that he has "lives" for playing in a game. Interface 1113 may then permit a user to activate the game or begin playing the game. For instance, instruction 1117 inform may a user that he may swipe in one direction to play the game. Instruction 1119 may give the user the option to unlock his phone. Accordingly, once a lock screen is downloaded, its functionality may include automatic additions to a user experience within an app, as well as automatic downloading and/or installation of additional apps associated with displayed advertising content in response to an input from a user (e.g., a directional swipe towards the left). Additionally, a particular directional swipe may lead to unlocking the phone and/or engaging with content displayed on the lock screen.

In summary, lock screen use adoption may be enhanced in numerous ways. In a first exemplary approach, offers to exchange services for vendor use of a display may be provided at different points in a user session or lifetime, for example, at app launch, a push notification to an inactive user, or within a particular step during app usage. Furthermore, continued use of a lock screen may be encouraged by providing varying timings for awarding discounts or services. For example, the awards may be provided immediately upon accepting the use of a lock screen. However, if a user disables and then re-enables a lock screen in the future, the awards or services may be delayed for another time, e.g., 30 days.

In an embodiment, in addition to a user's data usage, offers may be optimized by revenue associated with a user. For example, different offers may be provided to particular groups of users within a band of average revenue per unit.

Figure 12A:
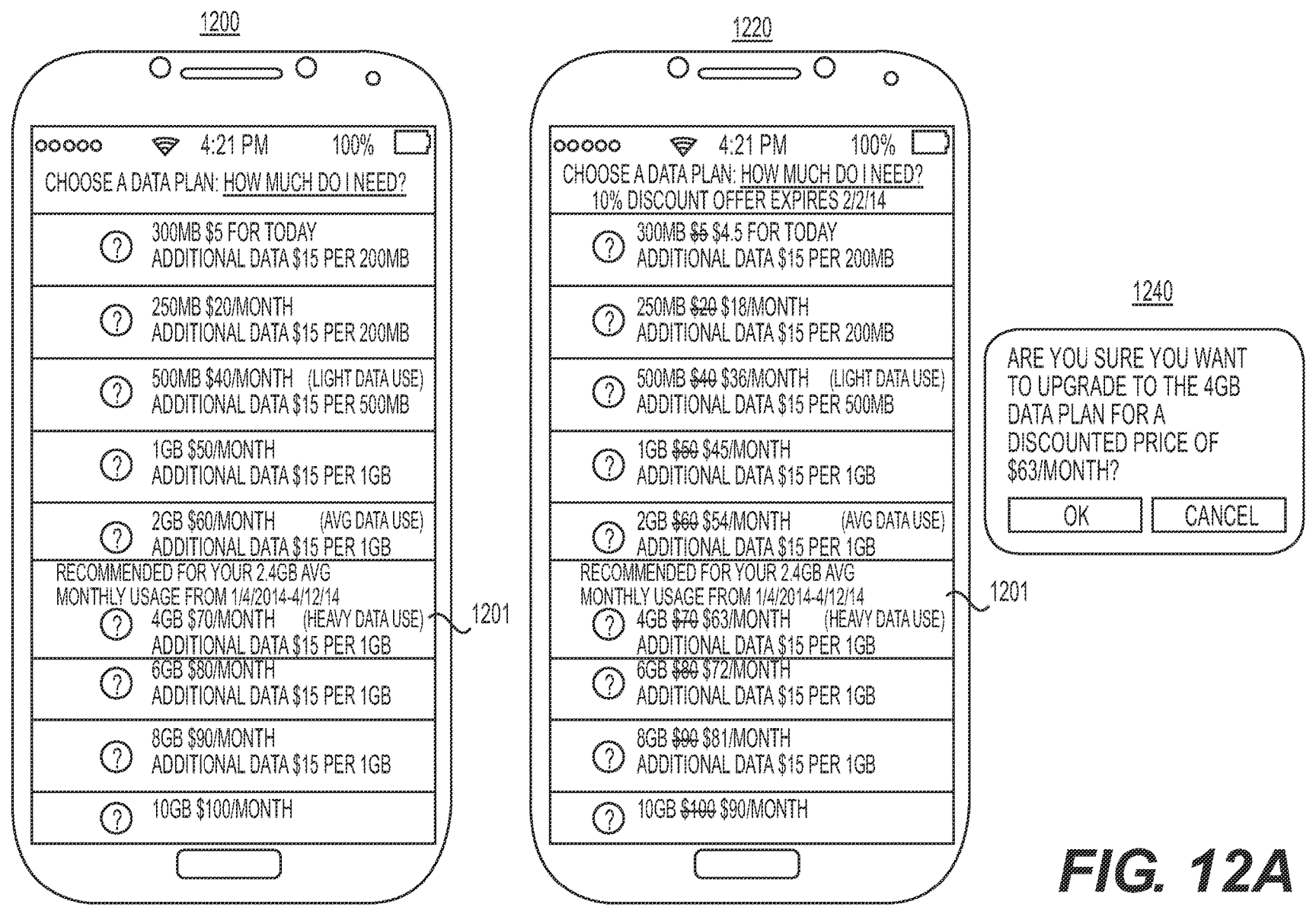
Figure 12B:
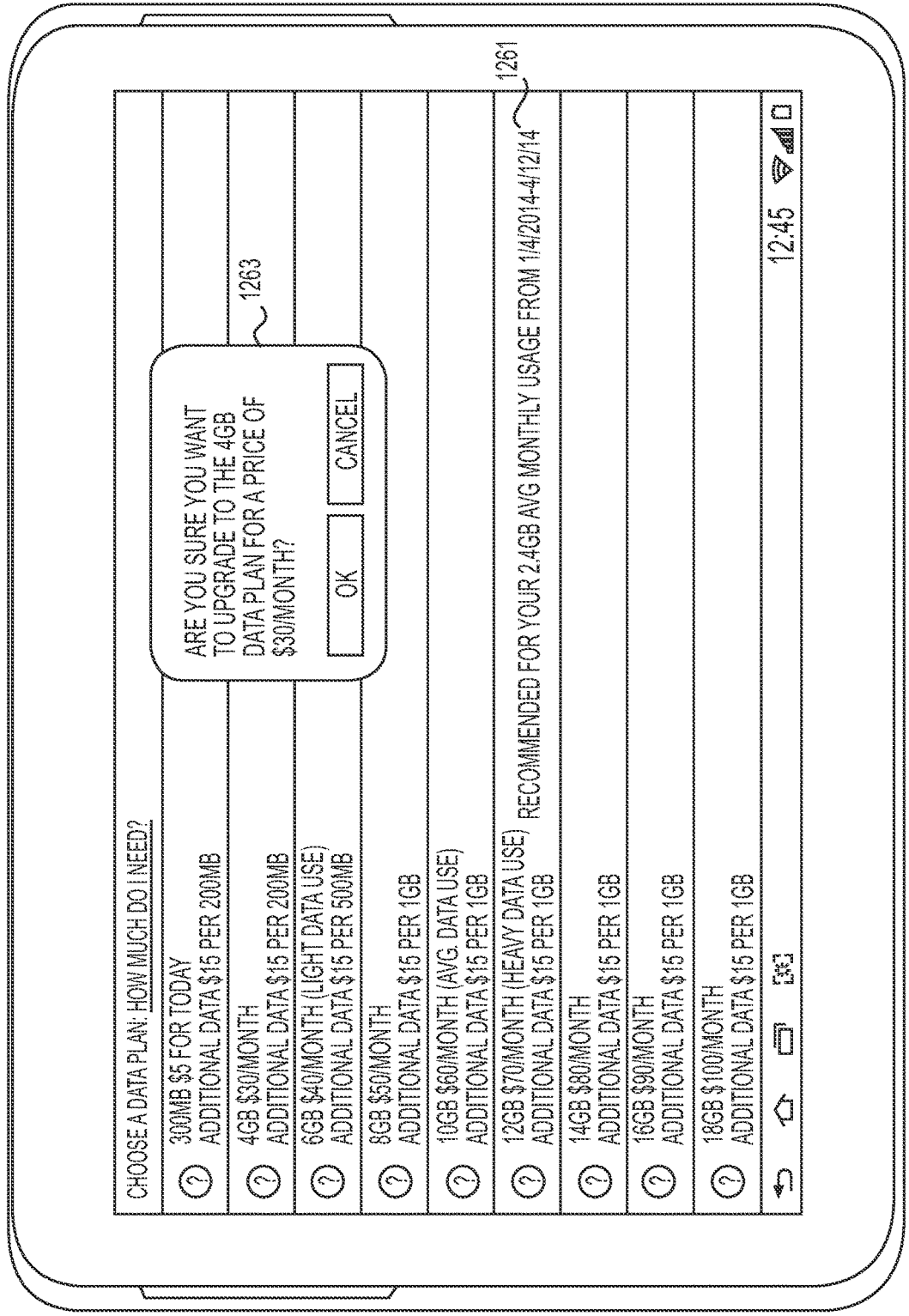

FIGS. 12A and 12B include diagrams of user interfaces showing data usage, according to an exemplary embodiment of the present disclosure. For example, a user may wish to upgrade to a higher data plan in noticing that ad displays are increasingly part of his user experience. In another example, the user interfaces presented in FIGS. 12A and 12B may be actively presented to a user upon detection that a user's data usage habits may be more suitable for a data plan other than the user's current plan. FIGS. 12A and 12B may provide exemplary user interfaces that facilitate user selection for a data plan change that may be appropriate for the user's data consumption. For example, FIG. 12A includes diagrams of exemplary user interfaces relating to a mobile phone. Interface 1220 may include a display of a user's data usage versus cost for available data plans, e.g., where available data plans may be discounted data plans that may include an ad supported data plan. Furthermore, interface 1200 and interface 1220 may permit user interaction with the interfaces to change the user's data plan. For example, interface 1220 may include a notification 1240, e.g., a prompt for a user to confirm a change in data plan. Notification 1240 may appear where user interaction with interface 1200 and/or interface 1220 is detected. In one embodiment, the interface 1200, interface 1220, and/or notification 1240 may be in communication with a payment entity, where a user's selection to change data plans causes automatic payment and immediate activation of an updated data plan. In one embodiment, interface 1200 and interface 1220 may include recommendations on a data plan that best suits a user's data usage. For example, suggestion 1201 may be part of a display so that a user may easily compare data plans. In one such case, usage may be monitored for a given amount of time and a suggested data plan may be created based on the results from the monitoring. In one embodiment, the suggested data plan may be created specifically for a user. In another embodiment, the suggested data plan may be an optimum data plan for a specific user, given the data plans available.

FIG. 12B includes analogous interface 1260 for data plan comparison on a tablet device, according to an exemplary embodiment of the present disclosure. In one embodiment, interface 1260 may include suggestion 1261 for a recommended data plan. Interface 1260 may further include notification 1263 to verify a user's selection to change data plans.

As previously discussed, a user may unlock individual apps, mobile websites, or content provider widgets and lock screens, either based on completing certain actions (e.g., contributing to user input) and/or paying a small fee (e.g., $5/month). Interfaces shown in FIGS. 6-12B are instances of user interfaces where a user may encounter such a micro plan. A user may employ the micro plan to test whether their data usage warrants an upgrade in a standard data plan. For example, if a user finds that she is often asked to complete actions, she may be using enough data that an upgrade may make sense. At that point, the user may opt for an upgrade in their standard data plan for a retail price (or a discounted price, perhaps associated with the initial micro plan).

Additional objects and advantages of the disclosed embodiments may be apparent from the previous description, or may be learned by practice of the disclosed embodiments. The objects and advantages of the disclosed embodiments will be realized and attained by means of the elements and combinations particularly pointed out in the appended claims.

It is to be understood that the general description is exemplary and explanatory only and not restrictive of the disclosed embodiments, as claimed.

Other embodiments of the disclosure will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method for processing electronic transactions between a user's device and a content provider, the method comprising:
   generating a display of electronic content within a user-specific proportion of a lock screen of the user's device; and
   providing an offer to the user related to the displayed electronic content, the offer being determined according to user behavior including how frequently the lock screen is displayed or how frequently the user interacts with the displayed content of the lock screen.

2. The method of claim 1, further comprising:
   determining a plurality of display options for the electronic content;
   retrieving a data consumption level associated with the user's device;
   selecting one or more of the plurality of display options based on the data consumption level associated with the user's device; and
   increasing a data consumption limit associated with the user's device based on user interaction with the electronic content displayed on the user's device, such that a greater amount of user interaction with the electronic content causes a greater increase in the data consumption limit.

3. The method of claim 2, wherein the plurality of display options vary according to user preferences, context information, and/or user interaction information.

4. The method of claim 2, further comprising:
   categorizing the plurality of display options; and
   creating associations between categories of the plurality of display options and data consumption levels.

5. The method of claim 4, further comprising:
   creating a hierarchy of the plurality of display options from most prominent display formats to least prominent display formats;
   defining the data consumption levels as low data consumption or high data consumption;
   associating the most prominent display options with low data consumption; and
   associating the least prominent display options with high data consumption.

6. The method of claim 2, further comprising:
   creating the plurality of display options for the electronic content.

7. The method of claim 1, further comprising:
   receiving, from a user of the user's device, a selection of custom notifications, wherein the custom notifications include one or more of health statistics provided by wearable technology, a personalized news feed, weather forecasts, and notifications from user-selected sources.

8. The method of claim 1, wherein the user-specific proportion of the lock screen occupied by the electronic content is further determined according to user selected options.

9. The method of claim 1, further comprising:
prompting a user to accept promotions in exchange for allowing display of electronic content on the lock screen.

10. The method of claim 1, wherein the user's device includes a mobile phone or a tablet.

11. A system for processing electronic transactions between a between a user's device and a content provider, the system comprising:
a data storage device storing instructions for processing electronic transactions; and
a processor configured to execute the instructions to perform a method comprising:
generating a display of electronic content within a user-specific proportion of a lock screen of the user's device; and
providing an offer to the user related to the displayed electronic content, offer being determined according to user behavior including how frequently the lock screen is displayed or how frequently the user interacts with the displayed content of the lock screen.

12. The system of claim 11, wherein the system is further configured for:
determining a plurality of display options for the electronic content;
retrieving a data consumption level associated with the user's device;
selecting one or more of the plurality of display options based on the data consumption level associated with the user's device; and
increasing a data consumption limit associated with the user's device based on user interaction with the electronic content displayed on the user's device, such that a greater amount of user interaction with the electronic content causes a greater increase in the data consumption limit.

13. The system of claim 12, wherein the plurality of display options vary according to user preferences, context information, and/or user interaction information.

14. The system of claim 12, wherein the system is further configured for:
categorizing the plurality of display options; and
creating associations between categories of the plurality of display options and data consumption levels.

15. The system of claim 14, wherein the system is further configured for:
creating a hierarchy of the plurality of display options from most prominent display formats to least prominent display formats;
defining the data consumption levels as low data consumption or high data consumption;
associating the most prominent display options with low data consumption; and
associating the least prominent display options with high data consumption.

16. The system of claim 11, wherein the system is further configured for:
receiving, from a user of the user's device, a selection of custom notifications, wherein the custom notifications include one or more of health statistics provided by wearable technology, a personalized news feed, weather forecasts, and notifications from user-selected sources.

17. The system of claim 11, wherein the user-specific proportion of the lock screen occupied by the electronic content is further determined according to user selected options.

18. The system of claim 17, wherein the system is further configured for:
associating lock screen displays with a particular goods or services provider; and
displaying electronic content for the particular goods or services provider on the lock screen of the user's device.

19. The system of claim 17, wherein the system is further configured for:
prompting a user to accept promotions in exchange for allowing display of electronic content on the lock screen.

20. The system of claim 11, wherein the user's device includes a mobile phone or a tablet.

* * * * *